United States Patent

Kawakami

(10) Patent No.: US 9,365,258 B2
(45) Date of Patent: *Jun. 14, 2016

(54) BICYCLE BRAKE AND SHIFT OPERATING DEVICE

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 735 days.

This patent is subject to a terminal disclaimer.

(21) Appl. No.: 12/824,339

(22) Filed: Jun. 28, 2010

(65) Prior Publication Data

US 2011/0314946 A1    Dec. 29, 2011

(51) Int. Cl.
*B62K 23/06* (2006.01)
*B60T 7/10* (2006.01)
*B62L 3/02* (2006.01)
*B62M 25/04* (2006.01)

(52) U.S. Cl.
CPC .............. *B62K 23/06* (2013.01); *B60T 7/102* (2013.01); *B62L 3/02* (2013.01); *B62M 25/04* (2013.01); *Y10T 74/20043* (2015.01)

(58) Field of Classification Search
CPC ....... B62K 23/02; B62K 23/06; B62M 25/04; B62M 25/02; B62M 25/00; B62L 3/02; Y10T 74/200438
USPC .............. 74/502.2, 488, 489, 473.14, 473.15, 74/501.6, 500.5, 501 R, 506, 505, 501.5, 74/505 R
See application file for complete search history.

(56) References Cited

U.S. PATENT DOCUMENTS

| | | | | |
|---|---|---|---|---|
| 3,596,530 A | * | 8/1971 | Yoshigai | .......................... 74/489 |
| 4,100,820 A | * | 7/1978 | Evett | ............................... 74/489 |
| 5,222,412 A | | 6/1993 | Nagano | |
| 5,241,878 A | | 9/1993 | Nagano | |
| 5,257,683 A | * | 11/1993 | Romano | ......................... 74/489 |
| 5,479,776 A | * | 1/1996 | Romano | ....................... 74/502.2 |
| 6,619,154 B2 | * | 9/2003 | Campagnolo | ................ 74/502.2 |
| 6,718,843 B2 | * | 4/2004 | Campagnolo | ................ 74/502.2 |
| 6,792,826 B2 | * | 9/2004 | Dal Pra' | ....................... 74/502.2 |

(Continued)

FOREIGN PATENT DOCUMENTS

| | | | | |
|---|---|---|---|---|
| JP | 62-161097 U | | 10/1987 | |
| JP | 08156871 A | * | 6/1996 | |
| JP | EP 1997724 A2 | * | 12/2008 | ............. B62K 23/06 |

OTHER PUBLICATIONS

European Search Report of corresponding EP Application. No. 11 16 2795.6 dated Jul. 10, 2012.

(Continued)

*Primary Examiner* — Daniel Yabut

(74) *Attorney, Agent, or Firm* — Global IP Counselors

(57) ABSTRACT

A bicycle brake and shift operating device is provided with a bracket, a brake operating member, a shift operating unit and a pawl releasing member. The brake lever is pivotally attached to the bracket at a pivot axis. The shift operating unit includes a takeup member pivotally mounted relative to the bracket and a locking pawl pivotally mounted relative to the bracket. The locking pawl moves between a locking position and a release position. The pawl releasing member pivots relative to the bracket to pivot. The pawl releasing member selectively locates the locking pawl from the locking position to the release position by pivoting around the third pivot axis. The pivot axis of the pawl releasing member is offset from both of the pivot axes of the takeup member and the locking pawl.

20 Claims, 17 Drawing Sheets

(56) References Cited

U.S. PATENT DOCUMENTS

| | | | |
|---|---|---|---|
| 2002/0020246 A1* | 2/2002 | Campagnolo | 74/502.2 |
| 2002/0124679 A1 | 9/2002 | Dal Pra | |
| 2004/0144193 A1 | 7/2004 | Sato et al. | |
| 2005/0016312 A1* | 1/2005 | Dal Pra' | 74/473.12 |
| 2006/0070479 A1 | 4/2006 | Ose | |
| 2006/0207375 A1 | 9/2006 | Jordan et al. | |
| 2006/0213311 A1* | 9/2006 | Ose | 74/502.2 |
| 2007/0012137 A1 | 1/2007 | Dal Pra' | |
| 2007/0068312 A1 | 3/2007 | Sato | |
| 2007/0137384 A1 | 6/2007 | Kawakami | |
| 2007/0137388 A1 | 6/2007 | Dal Pra | |
| 2007/0261507 A1 | 11/2007 | Funai | |
| 2008/0092690 A1 | 4/2008 | Kawakami | |
| 2008/0196537 A1 | 8/2008 | Dal Pra' | |
| 2008/0257098 A1 | 10/2008 | Kawakami | |
| 2008/0295638 A1 | 12/2008 | Miki et al. | |
| 2009/0031846 A1 | 2/2009 | Dal Pra'et al. | |
| 2009/0114051 A1* | 5/2009 | Miki | B62K 23/06 74/489 |
| 2009/0133526 A1* | 5/2009 | Dal Pra et al. | 74/502.2 |

OTHER PUBLICATIONS

Chinese Office Action of corresponding Chinese Application No. 201110099917.8 dated Feb. 28, 2014.

* cited by examiner

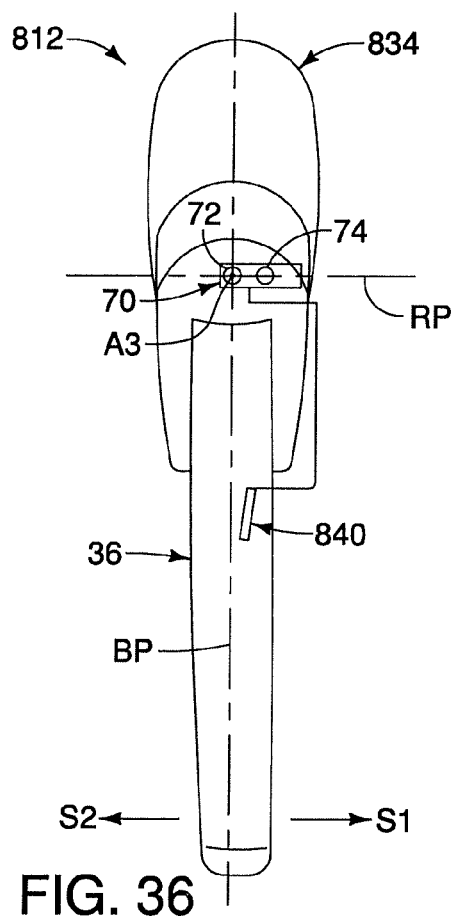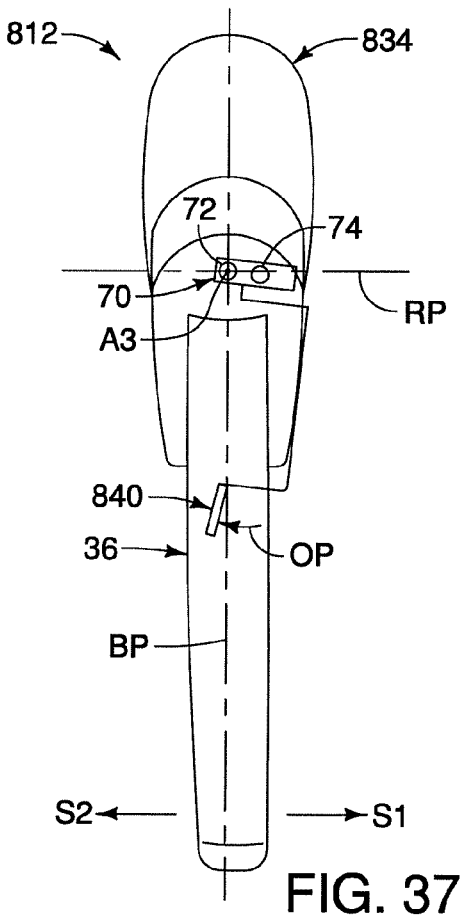

BICYCLE BRAKE AND SHIFT OPERATING DEVICE

BACKGROUND

1. Field of the Invention

This invention generally relates to a bicycle shift and brake control device for controlling a brake device and shifting a derailleur or the like. More specifically, the present invention relates to a bicycle shift and brake operating device in which a release operating member(s) is disposed in a convenient location.

2. Background Information

Typically, bicycles are provided with shift and brake control devices for controlling a brake device and gearing mechanisms (e.g., a derailleur mechanism or an internal hub gear mechanism) to select a desired gear ratio. Generally, the devices are mounted on the handlebar. Most mechanical brake and shift operating devices use control cables that connects the devices to the brake device for braking and the gear mechanism for changing gears. These control cables are typically Bowden type cables with an outer case and an inner wire. The inner wire is attached at one end to a take up member in the device and its other end is attached to a part of a gear changing device such as a derailleur. By rotating or pivoting the take up member in the device, the inner wire slides within the outer case to operate the gear changing device. Some mechanical shift and brake control devices are provided with a release lever for allowing movement of the takeup member in a first rotational direction to release the inner wire and a winding lever for allowing movement of the takeup member in a second rotational direction to pull the inner wire.

One example of this type of shift and brake control device is disclosed in U.S. Pat. No. 5,400,675 to Nagano (assigned to Shimano, Inc). More typically, one or two shift levers are provided in addition to the brake lever. Two examples of this type of control device are disclosed in U.S. Pat. No. 5,257,683 to Romano (assigned to Campagnolo) and U.S. Publication Patent No. 2007-0012137 to Dal Pra' (assigned to Campagnolo).

SUMMARY

One aspect is to provide a drop down style bicycle shifter in which a release operating member(s) is disposed in a convenient location.

In view of the state of the known technology, a bicycle brake and shift operating device is proposed that basically comprises a bracket, a brake operating member, a shift operating unit and a pawl releasing member. The bracket includes a grip portion. The brake operating member is pivotally attached to the bracket at a pivot axis. The shift operating unit includes a takeup member pivotally mounted relative to the bracket to pivot on a first pivot axis and a locking pawl pivotally mounted relative to the bracket to pivot on a second pivot axis. The locking pawl is movably arranged between a locking position in which the locking pawl holds the takeup member and a release position in which the locking pawl releases the takeup member. The pawl releasing member is pivotally mounted relative to the bracket to pivot on a third pivot axis. The pawl releasing member selectively locates the locking pawl from the locking position to the release position by pivoting around the third pivot axis. The third pivot axis of the pawl releasing member is offset from both of the first and second pivot axes of the takeup member and the locking pawl.

Various objects, features, aspects and advantages of the present disclosure will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 36 is a simplified schematic front elevational view of a right bicycle shift and brake control device, similar to the right bicycle shift and brake control device illustrated in FIG. 33, but with a modified release operating member that is in a rest position; and FIG. 37 is a simplified schematic front elevational view of the right bicycle shift and brake control device illustrated in FIG. 36 with the modified release operating member held in a wire release position.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
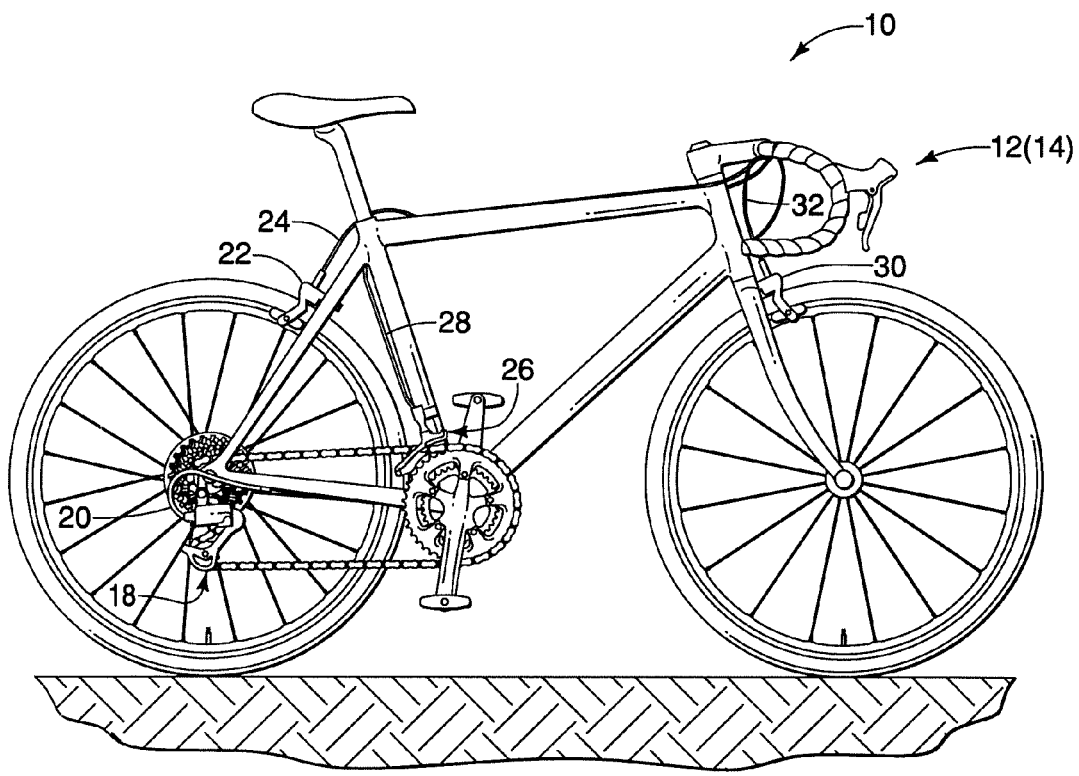
FIG. 1 is a side elevational view of a bicycle that is equipped with a pair of mechanical bicycle shift and brake control devices in accordance with a first embodiment.
Figure 2:
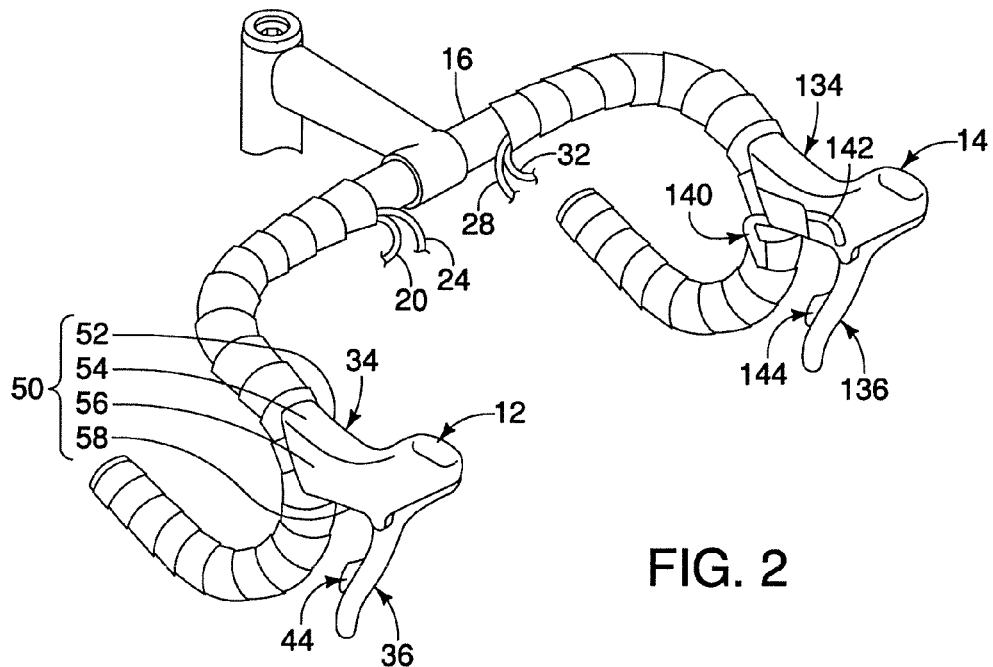
FIG. 2 is an enlarged partial perspective view of the drop type handlebar with the bicycle shift and brake control devices in accordance with the first embodiment.

Referring initially to FIGS. 1 and 2, a bicycle 10 is illustrated that is equipped with a pair of mechanical bicycle brake and shift operating or control devices 12 and 14 in accordance with a first embodiment. The control devices 12 and 14 constitute bicycle component (brake/shift) actuating devices. The control devices 12 and 14 are mounted to a drop down handlebar 16. The control device 12 is a right hand side control device operated by the rider's right hand, while the control device 14 is a left hand side control device operated by the rider's left hand. Thus, the control device 12 will be referred to hereinafter as the right control device and the control device 14 will be referred to hereinafter as the left control device.

In the illustrated embodiment, the right control device 12 is operatively coupled to a rear derailleur 18 via a rear shift control cable 20 and a rear brake device 22 via a rear brake control cable 24. The left control device 14 is operatively coupled to a front derailleur 26 via a front shift control cable 28 and a front brake device 30 via a front brake control cable 32. Alternatively, the control devices 12 and 14 can be switched so that the rider can operate the rear derailleur 18 and the front derailleur 26 with opposite hands and/or operate the rear and front brake devices 22 and 30 with opposite hands.

In the illustrated embodiment, the left control device 14 is substantially identical to the right control device 12, except for a shifting operating unit has been modified to reduce the number of gears that can be shifted. In any event, the left control device 14 is essentially identical in construction and operation to the right control device 12, except that the left control device 14 is a mirror image of the right control device 12 and the number of shift positions for the control devices 12 and 14 are different. Thus, only the right control device 12 will be discussed and illustrated herein.

Preferably, the cables 20, 24, 28 and 32 are conventional bicycle control cables that have an outer case that covers an inner wire. For example, in the case of the right control device 12, the rear shift control cable 20 and the rear brake control cable 24 are conventional Bowden cables. The rear shift control cable 20 has an outer case 20a and an inner wire 20b. The rear brake control cable 24 has an outer case 24a and an inner wire 24b.

Figure 3:
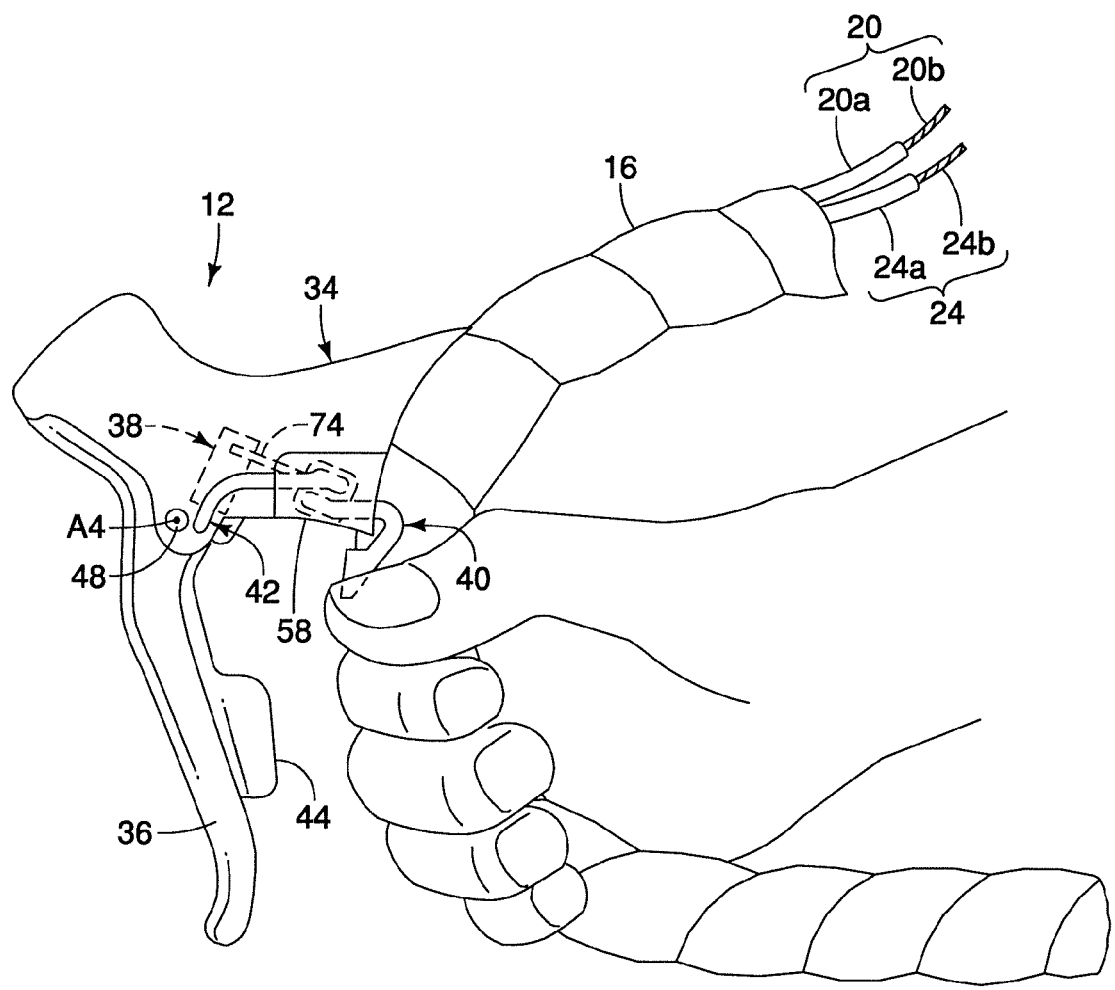
FIG. 3 is an inside elevational view of the right bicycle shift and brake control device attached to the curved portion of the handlebar and a rider's hand gripping the curved portion of the handlebar.
Figure 4:
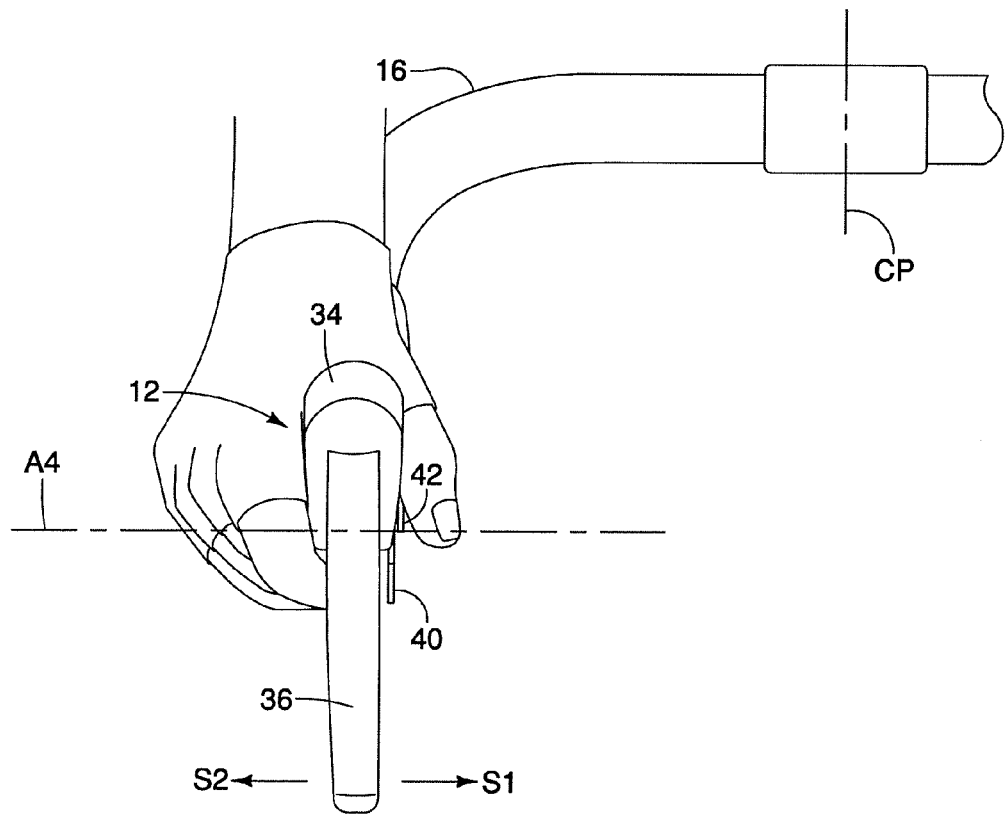
FIG. 4 is a front elevational view of the right bicycle shift and brake control device attached to the curved portion of the handlebar and a rider's hand gripping the grip portion of the right bicycle shift and brake control device without depressing one of the release operating members.
Figure 5:
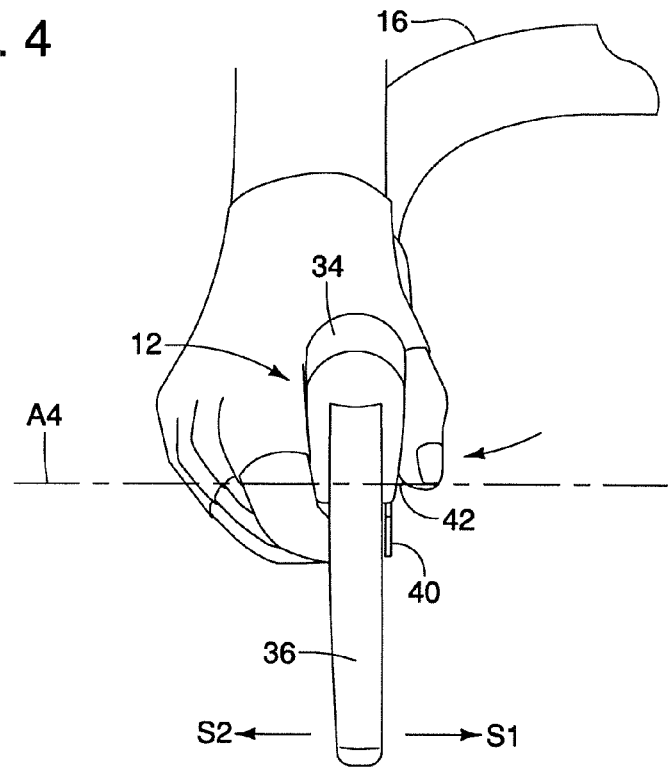
FIG. 5 is a front elevational view, similar to FIG. 4, of the right bicycle shift and brake control device attached to the curved portion of the handlebar and a rider's hand gripping the grip portion of the right bicycle shift and brake control device, but with one of the release operating members being depressed.

Referring now to FIGS. 3 to 6, the right control device 12 includes a bracket 34, a brake operating member or lever 36, a shift operating or control unit 38, a first release operating member or lever 40, a second release operating member or lever 42 and a winding operating member or lever 44. The right control device 12 is mounted to the curved part of the handlebar 16 such that the first release operating member 40 is operated by a right thumb of the rider while the rider's hand grips the curved portion of the handlebar 16 as seen in FIG. 3. Also, as seen in FIGS. 4 and 5, the bracket 34 is configured with respect to the second release operating member 42 such that the second release operating member 42 is operated by one of the right fingers of the rider (normally rider's forefinger) while the rider's hand grips the bracket 34.

Figure 6:
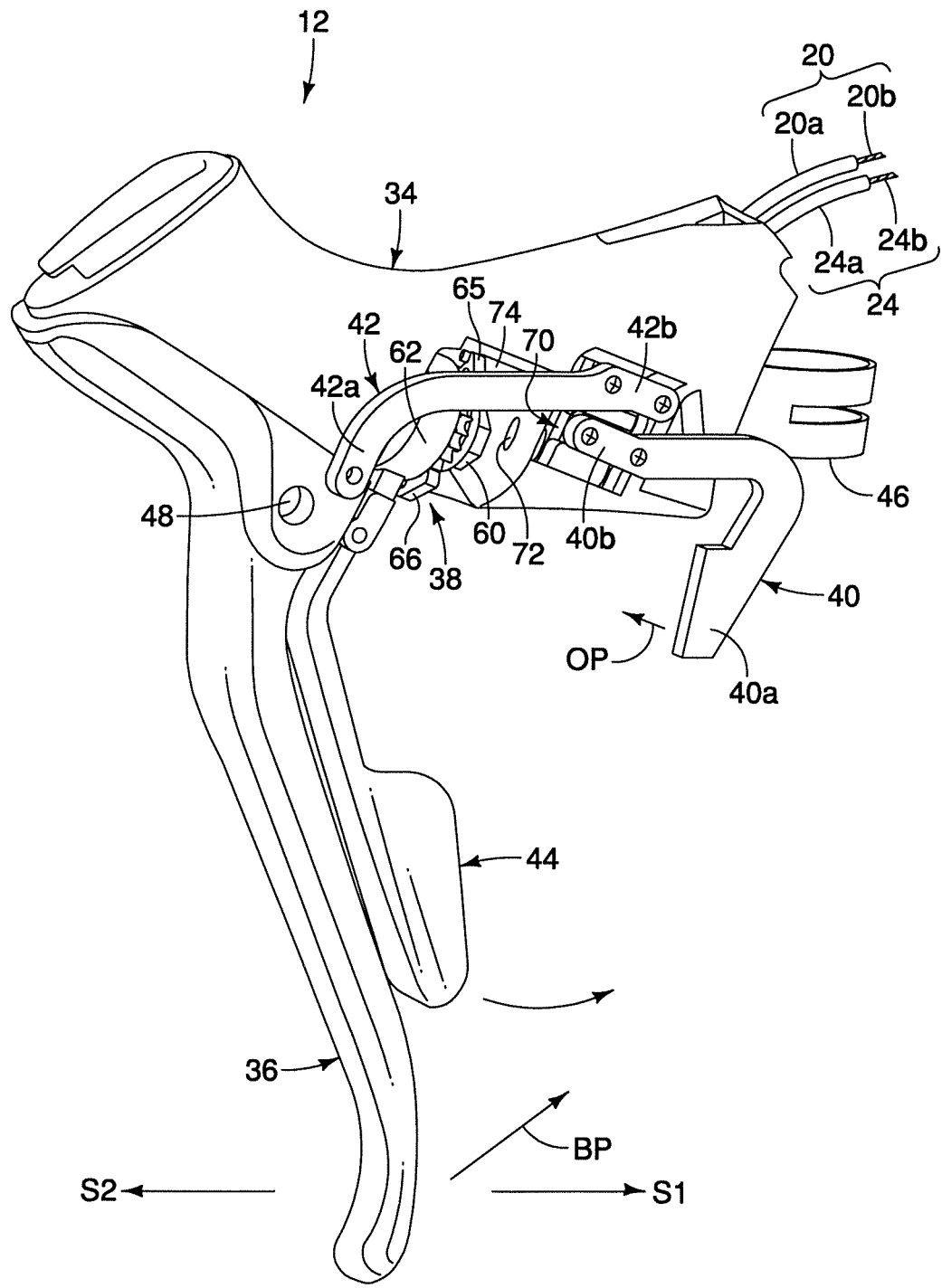
FIG. 6 is an inside perspective view of the right bicycle shift and brake control device in accordance with the first embodiment.

Referring now to FIGS. 3 and 6, the bracket 34 is a hard, rigid member that is often constructed of a hard plastic resin or a carbon fiber reinforced material. The bracket 34 can be constructed of one or more pieces, as needed and/or desired. Typically, the bracket 34 has an elastomeric cover as seen in FIG. 3. In FIG. 6, the elastomeric cover has been removed to show the rigid main body part of the bracket 34. The bracket 34 has a handlebar mounting structure 46 (FIG. 6) located at a first (rear) end of the bracket 34 for attaching the bracket 34 to the curved part (FIG. 3) of the handlebar 16. The brake operating member 36 is pivotally coupled to the bracket 34 by a pivot pin 48 such that the brake operating member 36 moves along a braking plane BP (FIG. 6) that is disposed between first and second (left and right) exterior lateral sides S1 and S2 of the bracket 34. In this illustrated embodiment, the bracket 34 has a recess that houses a shift operating unit 38. Optionally, a removable panel can partially cover this recess in the main body of the bracket 34 as needed and/or desired.

The bracket 34 includes a rider grip portion 50. The term "grip portion" as used herein refers to the part of the main body of the bracket 34 that is covered by an elastomeric cover. In this illustrated embodiment, the elastomeric cover (grip portion) extends from the handlebar mounting structure 46 (e.g., a tube clamp in the illustrated embodiment) to a point just rear of the brake operating member 36 and over the top of the distal end from the handlebar mounting structure 46. The rider grip portion 50 is often used by riders when the rider is standing on the pedals without sitting on the bicycle seat.

In the illustrated embodiment, as best seen in FIG. 2, the rider grip portion 50 has a generally rounded rectangular shape in cross section that is perpendicular to the braking plane BP. The rider grip portion 50 has an inward facing (inner) exterior lateral side 52, an upward facing (top) exterior side 54, an outward facing (outer) exterior lateral side 56 and a downward facing (bottom) exterior side 58. The exterior lateral sides 52 and 56 can be referred to as "first" and "second" exterior lateral sides, respectively, or vice-a-versa. Likewise, the exterior sides 54 and 58 can be referred to as "first" and "second" exterior sides, respectively, or vice-a-versa.

The inner exterior lateral side 52 faces towards a bicycle longitudinal center plane CP (FIG. 4) when the right control device 12 is in the normal installed position on the curved part (FIG. 3) of the handlebar 16. The outer exterior lateral side 56 faces away from the bicycle longitudinal center plane CP when the right control device 12 is in the normal installed position on the curved part (FIG. 3) of the handlebar 16. The top and bottom exterior sides 54 and 58 extend between the exterior lateral sides 52 and 56, with the top exterior side 54 in an upward direction and the bottom exterior side 58 facing in a downward direction when the right control device 12 is in the normal installed position on the curved part (FIG. 3) of the handlebar 16. The brake operating member 36 extends outwardly from the bracket 34 adjacent the bottom exterior side 58 of the grip portion 50 that extends between the exterior lateral sides 52 and 56.

As mentioned above, the brake operating member 36 is pivotally attached to the bracket 34 to perform a braking operation as the brake operating member 36 is pivoted rearward along the braking plane BP from its rest position (FIGS. 3 and 6). The brake operating member 36 is attached to one end of the inner wire 24b of the rear brake control cable 24 in a conventional manner. Thus, the inner wire 24b is pulled to perform a braking operation as the brake operating member 36 is moved rearward along the braking plane BP from its rest position (FIGS. 3 and 6). The brake operating member 36 is biased to the rest position (FIGS. 3 and 6) by a biasing element (not shown) positioned between the bracket 34 and the brake operating member 36. The structure and operation of the brake operating member 36 are relatively conventional in the illustrated embodiment, and thus, the brake operating member 36 will not be discussed in further detail.

Figure 7:
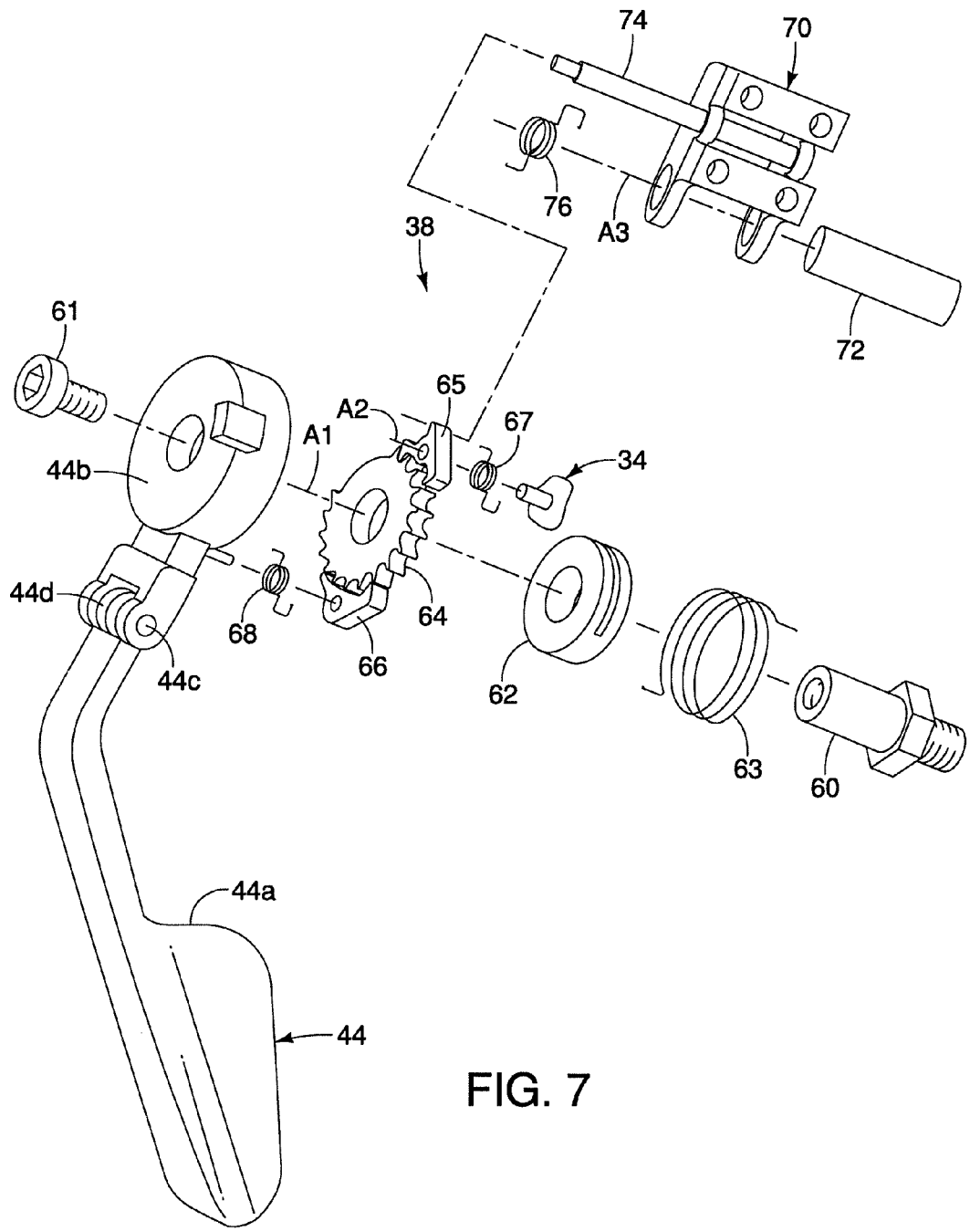
FIG. 7 is an exploded perspective view of the shift operating unit of the right bicycle shift and brake control device in accordance with the first embodiment.
Figure 8:
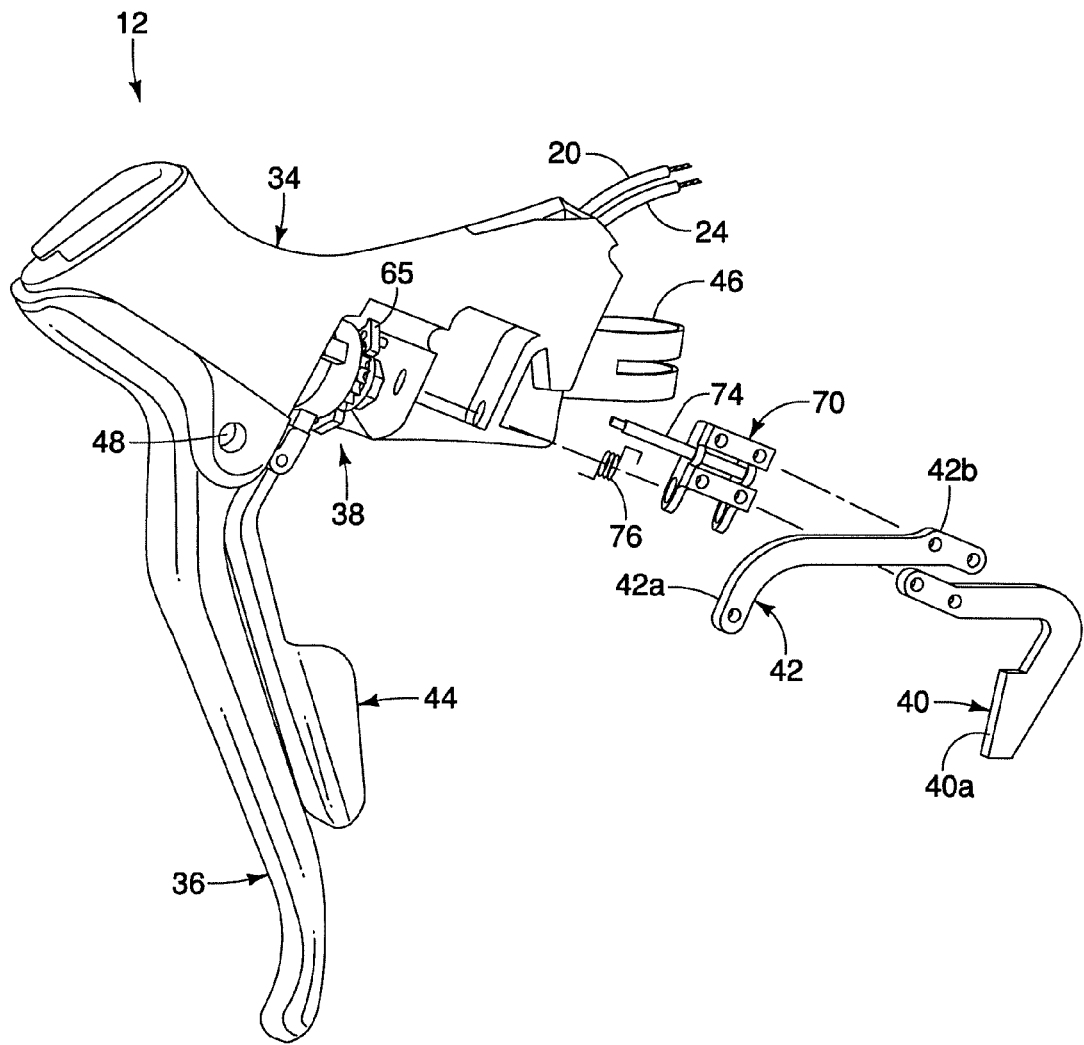
FIG. 8 is a perspective view of the right bicycle shift and brake control device illustrated in FIGS. 1 to 6 with selected parts exploded outwardly from the bracket of the right bicycle shift and brake control device.

As best seen in FIGS. 6 to 8, the shift operating unit 38 is located in a shift unit receiving recess that is formed on the inner exterior lateral side 52 of the bracket 34. The shift operating unit 38 is mainly supported on the bracket 34 by a support pin or main axle 60 that forms a first or main pivot axis A1 of the shift operating unit 38. The winding operating member 44 is also pivotally supported on the support pin 60. The winding operating member 44 is pivotally retained on the support pin 60 by a bolt 61 that threads into a threaded bore of the support pin 60. Also, the winding operating member 44 is biased to the rest position (FIGS. 3 and 6) by a biasing element (not shown).

Shift operating units such as the shift operating unit 38 are well known in the bicycle field. Of course, other types of shift operating units can be used as needed and/or desired if they can be operated with the release operating members 40 and/or 42. In the illustrated embodiment, the shift operating unit 38 basically includes a takeup member (wire takeup member) 62, a torsion spring 63, a gear positioning plate or member 64, a locking pawl 65 and a winding pawl 66. The takeup member 62 and the gear positioning plate 64 are fixed together as an integrated unit so as to rotate together. Thus, the takeup member 62 and the gear positioning plate 64 are both pivotally mounted together on the support pin 60 such that they pivot along a curved path that has its center positioned on the first pivot axis A1.

The takeup member 62 is attached to the inner wire 20b of the shift control cable 20. Rotation of the takeup member 62 in a wire releasing direction releases the inner wire 20b of the shift control cable 20 in response to operation of the first and second release operating members 40 and 42. Rotation of the takeup member 62 in a wire pulling direction pulls the inner wire 20 of the shift control cable 20 in response to operation of the winding operating member 44. In the illustrated embodiment, the wire releasing direction is clockwise with respect to the first or main pivot axis A1 of the shift operating unit 38 as viewed from the front end of the right control device 12, while the wire pulling direction is counterclockwise with respect to the first or main pivot axis A1 of the shift operating unit 38 as viewed from the front end of the right control device 12.

The torsion spring 63 constitutes a return spring or biasing element that is operatively coupled between the takeup member 62 and the bracket 34 to urge the takeup member 62 in a wire releasing direction. In the illustrated embodiment, the torsion spring 63 with one end fixed to the takeup member 62 and the other end fixed to the bracket 34. Since the gear positioning plate 64 is fixed to the takeup member 62, the gear positioning plate 64 is also biased in the wire releasing direction (clockwise as seen in FIGS. 10 and 11).

The gear positioning plate 64 is a hard rigid member that is constructed of a suitable material such as a metal plate. As mentioned above, the gear positioning plate 64 is movably supported on the support pin 60 and configured to integrally move with the takeup member 62. The gear positioning plate 64 has a plurality of positioning teeth 64a and a plurality of winding teeth 64b. The gear positioning plate 64 is biased in the wire releasing direction (clockwise as seen in FIGS. 10 and 11) by the torsion spring 63. However, the locking pawl 65 normally holds the gear positioning plate 64 in place against the urging force of the torsion spring 63, since the locking pawl 65 is biased into engagement with the positioning teeth 64a. Thus, the locking pawl 65 can also be considered a positioning/release pawl that is configured to selectively engage the positioning teeth 64a of the gear positioning plate 64 such that the gear positioning plate 64 has a plurality of operating positions. Accordingly, the locking pawl 65 contacts the positioning teeth 64a of the gear positioning plate 64 to attain the plurality of operating positions by preventing the takeup member 62 from moving with respect to the bracket 34 in the wire releasing direction when the locking pawl 65 is engaged with one of the positioning teeth 64a.

Figure 10:
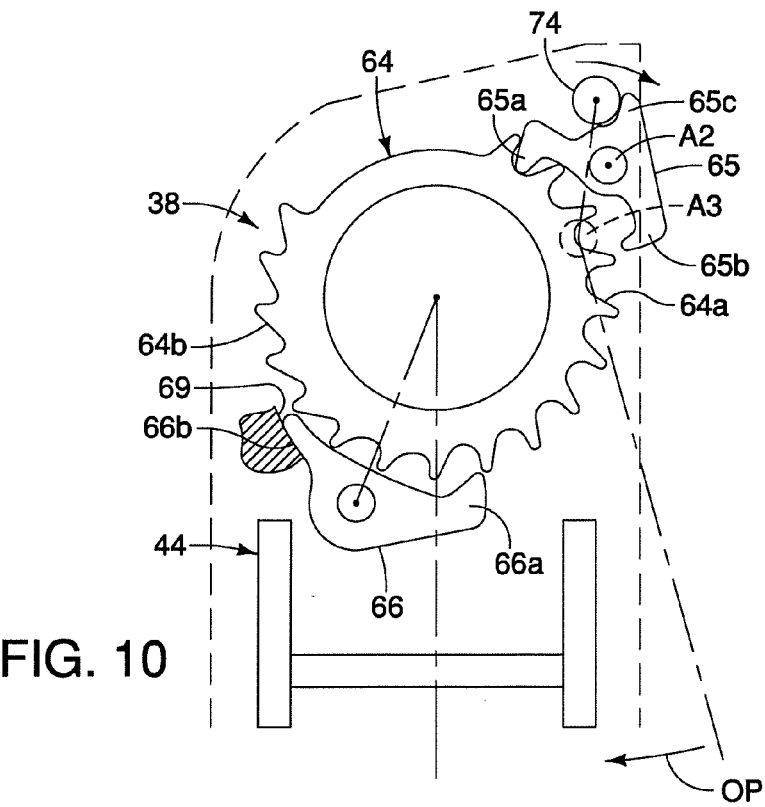
FIG. 10 is a simplified illustration of selected parts of the shift operating unit illustrated in FIG. 7 with the shift operating unit in a rest position.
Figure 11:
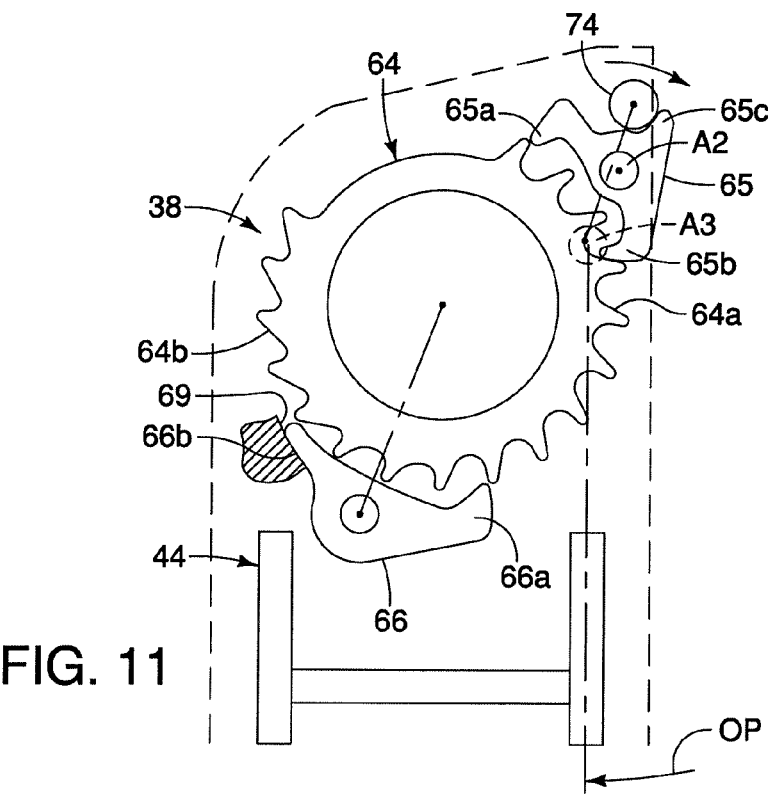
FIG. 11 is a simplified illustration of selected parts of the shift operating unit illustrated in FIG. 7 with the release pawl moved to a release position for performing a wire releasing operation.

On the other hand, the winding pawl 66 is configured and arranged to move the gear positioning plate 64 in the wire pulling direction (counterclockwise as seen in FIGS. 10 and 11). The winding pawl 66 is mounted on the winding operating member 44 such that the winding pawl 66 moves with the winding operating member 44 as the winding operating member 44 is pivoted on the first pivot axis A1. When the winding operating member 44 is in the rest position, the winding pawl 66 is held out of engagement from the winding teeth 64b. However, as the winding operating member 44 is pivoted (counterclockwise as seen in FIGS. 10 and 11), the winding pawl 66 moves into engagement with one of the winding teeth 64b to rotate the takeup member 62 and the gear positioning plate 64 together against the urging force of the torsion spring 63. This rotation of the takeup member 62 causes the inner wire 20b to wind on the takeup member 62.

The locking pawl 65 is movably arranged on the bracket 34 to selectively engage the positioning teeth 64a of the gear positioning plate 64. In this particular embodiment, the locking pawl 65 is pivotally mounted relative to the bracket 34 to pivot on a second pivot axis A2 that is formed by a pin of the bracket 34. Thus, the locking pawl 65 is movably arranged between a locking position and a release position. A torsion spring 67 biases the locking pawl 65 to the locking position.

The locking pawl 65 includes a locking tooth 65a, a restricting tooth 65b and an actuating abutment 65c. In the locking position of the locking pawl 65, the locking tooth 65a of the locking pawl 65 engages one of the positioning teeth 64a of the gear positioning plate 64 to hold the takeup member 62 for maintaining a desired gear position of the rear derailleur 18. As the locking pawl 65 moves from the locking position to the release position, the locking pawl 65 initially releases the gear positioning plate 64 and the takeup member 62 so that the gear positioning plate 64 and the takeup member 62 can move together under the urging force of the torsion spring 63. In the release position of the locking pawl 65, the locking pawl 65 rotates in a clockwise direction as seen in FIGS. 10 and 11 so that the restricting tooth 65b engages one of the positioning teeth 64a of the gear positioning plate 64. The restricting tooth 65b restricts movement of gear positioning plate 64 such that the gear positioning plate 64 cannot rotate more than one gear position.

Now the configuration and operation of the winding pawl 66 will be discussed in more detail. The winding pawl 66 is pivotally mounted on a pin of the winding operating member 44. The winding pawl 66 includes a driving tooth 66a and a disengagement part 66b. The winding pawl 66 is biased towards engagement with the winding teeth 64b, but is prevented from engaging the winding teeth 64b when the winding operating member 44 is in the rest position. In particular, the bracket 34 has an abutment 69 that contacts the disengagement part 66b and rotates the winding pawl 66 out of engagement from the winding teeth 64b when the winding operating member 44 is in the rest position. However, as the winding operating member 44 is pivoted (counterclockwise as seen in FIGS. 10 and 11), the driving tooth 66a of the winding pawl 66 moves into engagement with one of the winding teeth 64b by an urging force of a torsion spring 68. Once the driving tooth 66a of the winding pawl 66 moves into engagement with one of the winding teeth 64b, the takeup member 62 and the gear positioning plate 64 rotate together against the urging force of the torsion spring 63 as the winding operating member 44 is pivoted (counterclockwise as seen in FIGS. 10 and 11).

Figure 14:
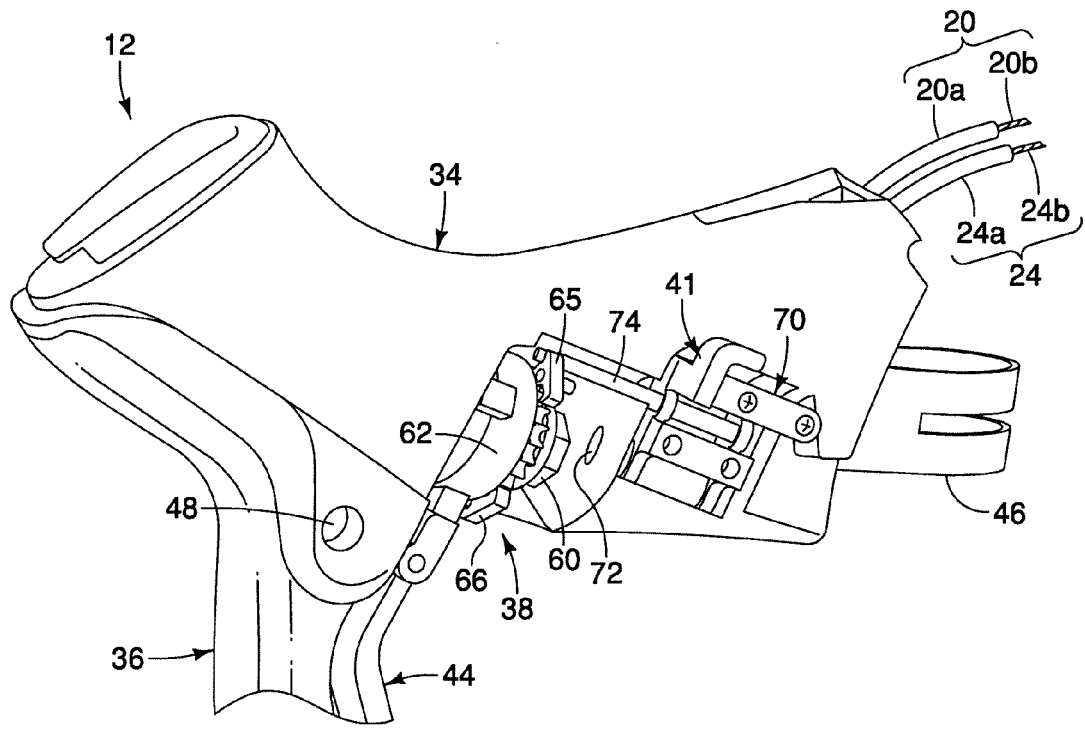
FIG. 14 is an enlarged perspective view of a portion of the right bicycle shift and brake control device illustrated in FIGS. 1 to 6, but with a differently shaped release operating member attached to the pawl releasing member.
Figure 15:
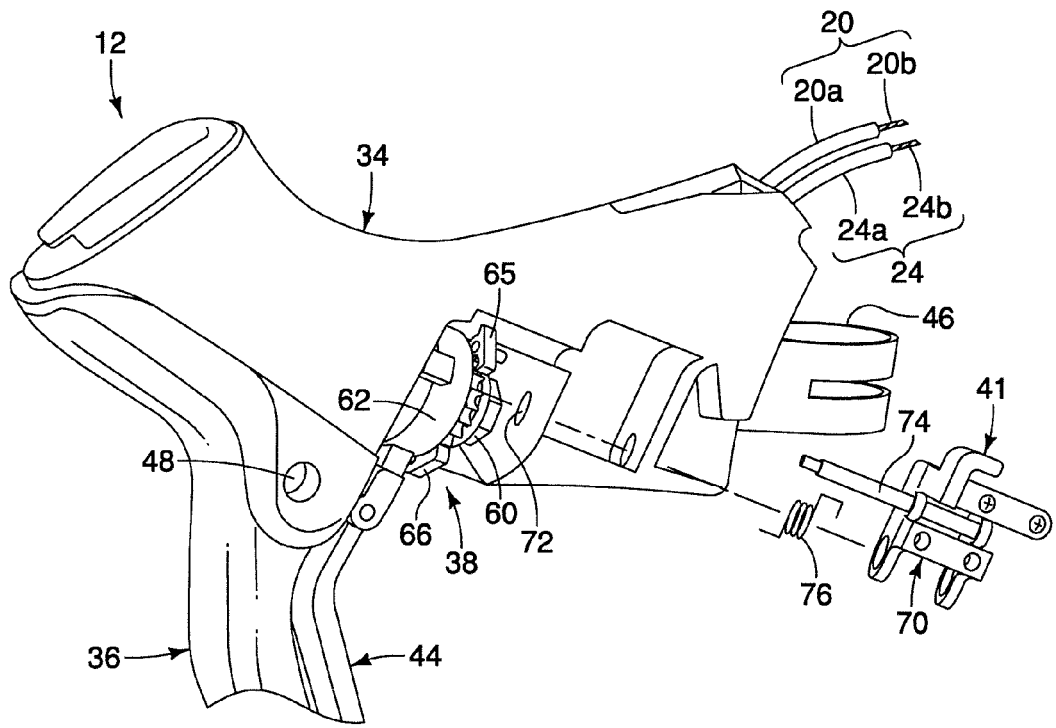
FIG. 15 is a perspective view of the right bicycle shift and brake control device illustrated in FIG. 14 with selected parts exploded outwardly from the bracket of the right bicycle shift and brake control device.

As seen in FIG. 6, the release operating member 40 is operatively coupled to the bracket 34 by a pawl releasing member 70 that pivots on a release operating member (third) pivot axis A3. In this embodiment, the release operating member 40 is attached to the pawl releasing member 70 by a detachable/reattachable fastening structure (e.g., two screws) that is configured for detaching and reattaching release operating member 40. In this way, differently shaped release operating members or a replacement release operating member can be installed on the releasing member 70. For example, as seen in FIGS. 14 and 15, an alternate release operating member 41 is attached to the pawl releasing member 70 of the right bicycle shift and brake control device 12. Other than the shape of the alternate release operating member 41 being different from the release operating member 40, the alternate release operating member 41 performs the same function of the release operating member 40.

The release operating member 40 includes a user operating portion 40a and an actuating portion 40b. In the illustrated embodiment, the actuating portion 40b of the release operating member 40 is attached to the pawl releasing member 70 on the first side S1 of the braking plane BP. The actuating portion 40b of the release operating member 40 forms a operating member attachment point that is spaced from the release operating member pivot axis A3. The user operating portion 40a of the release operating member 40 is disposed adjacent the bottom exterior side 58 of the grip portion 50 and outside a peripheral outline of the bracket 34 as viewed in a direction which is parallel to a brake operating member pivot axis A4 (FIGS. 4 and 5) of the brake operating member 36.

Figure 12:
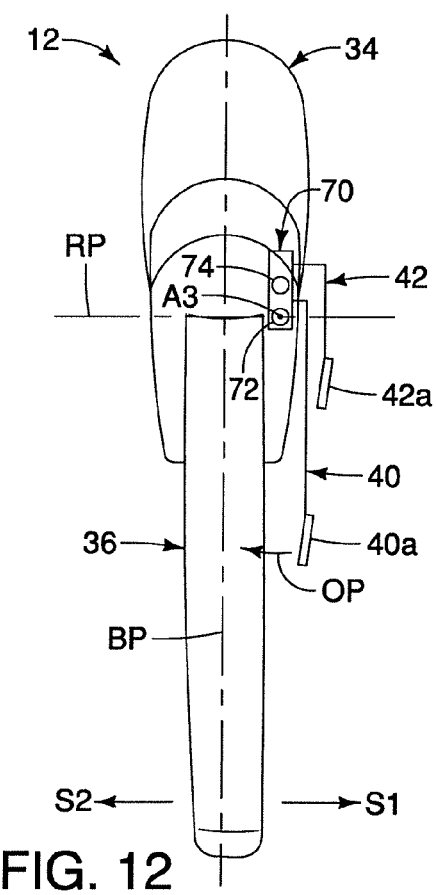
FIG. 12 is a simplified schematic front elevational view of the right bicycle shift and brake control device illustrated in FIGS. 1 to 6 with the release operating members in a rest position.
Figure 13:
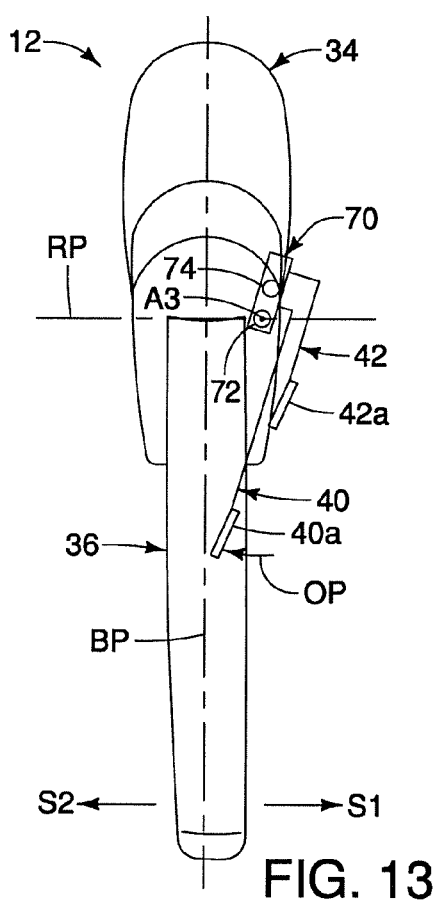
FIG. 13 is a simplified schematic front elevational view of the right bicycle shift and brake control device illustrated in FIGS. 1 to 6 with the release operating members held in a wire release position.

As seen in the schematic illustration of FIGS. 12 and 13, the release operating member 40 is pivotally coupled to the bracket 43 by the pawl releasing member 70 at a release operating member pivot axis A3 such that the user operating portion 40a moves along an operating path OP between a rest position (FIG. 12) and a release position (FIG. 13) with the operating path OP being disposed solely on the first side S1 of the braking plane BP. In other words, the release operating member 40 is pivotally coupled to the bracket 34 such that the user operating portion 40a is always located on the first side S1 of the braking plane BP whether in the rest position or the release position. The user operating portion 40a of the release operating member 40 is also disposed at a handlebar attachment end of the grip portion 50 of the bracket 34. In this way, the rider can easily operate the user operating portion 40a with the rider's thumb while gripping the curved part of the handlebar 16 as seen in FIG. 3.

Also as seen in the schematic illustration of FIGS. 12 and 13, the user operating portion 40a is disposed on a first or lower side of a reference plane RP extending perpendicular to the braking plane BP with the release operating member pivot axis A3 lying in the reference plane RP and the operating member attachment point being disposed on a second or upper side of the reference plane RP that is opposite the first or lower side of the reference plane RP. The user operating portion 40a moves in direction closer towards the brake operating member 36 as the user operating portion 40a moves along the operating path OP to perform a releasing operation in response to movement of the user operating portion 40a from the rest position to the release position. In other words, the user operating portion 40a moves in direction closer towards the brake operating member 36 as the user operating portion 40a moves along the operating path from the rest position towards the braking plane BP to perform a releasing operation in response to movement of the user operating portion 40a from the rest position to the release position.

Similar to the release operating member 40, discussed above, the release operating member 42 includes a user operating portion 42a and an actuating portion 42b. The user operating portion 42a has a free end that is spaced from the free end of the user operating portion 40a, as seen in FIG. 6. In the illustrated embodiment, the actuating portion 42b of the release operating member 42 is attached to the pawl releasing member 70 on the first side S1 of the braking plane BP. Since the second (additional) release operating member 42 is also attached to the pawl releasing member 70, the release operating member 42 is pivotally coupled to the bracket 43 by the pawl releasing member 70 at the release operating member pivot axis A3 such that the release operating members 40 and 42 move together as a unit with the pawl releasing member 70. The user operating portion 42a is disposed along the first exterior lateral side 52, with the user operating portion 42a moving towards the first exterior lateral side 52 as the release operating member 42 moves along the operating path OP to perform the releasing operation in response to movement of the user operating portion 42a from the rest position of the second release operating member 42 to the release position of the second release operating member 42.

In the illustrated embodiment, the actuating portion 40b of the release operating member 40 is attached by a pair of screws to a first attachment position of the pawl releasing member 70 that is located below a second attachment position of the pawl releasing member 70 where the actuating portion 42b of the release operating member 42 is attached by a pair of screws. In will be apparent from this disclosure that the actuating portions 40b and 42b of the release operating members 40 and 42 can be switch so that the actuating portions 40b of the release operating member 40 is attached to the second attachment position of the pawl releasing member 70 and the actuating portion 42b of the release operating member 42 is attached to the first attachment position of the pawl releasing member 70.

As seen in FIGS. 4 to 6, the user operating portion 42a of the release operating member 42 is further disposed at an end of the grip portion 50 of the bracket 34 that is located adjacent the brake operating member pivot axis A4 of the brake operating member 36. In this way, a rider's finger can depress the user operating portion 42a of the release operating member 42 while a rider's hand grips the grip portion 50 of the right control device 12. In this case, the user operating portion 42a of the release operating member 42 is disposed adjacent the bottom exterior side 58 of the grip portion 50 and disposed within the peripheral outline of the bracket 34 as viewed parallel to the brake operating member pivot axis A4 (FIGS. 4 and 5) of the brake operating member 36.

As mentioned above, in the first illustrated embodiment, the first release operating member 40 and the second release operating member 42 are pivotally mounted relative to the bracket 34 by the pawl releasing member 70. In particular, the pawl releasing member 70 is pivotally mounted relative to the bracket 34 by a pivot pin 72 that defines the third pivot axis A3 of the first release operating member 40 and the second release operating member 42. The pawl releasing member 70 is disposed rearward of the takeup member 62. The pawl releasing member 70 is disposed on the inner exterior lateral side 52 of the grip portion 50 of the bracket 34. The pawl releasing member 70 includes an elongated bar 74 that constitutes an elongated portion to operating the shift operating unit 38 as discussed below.

Figure 9:
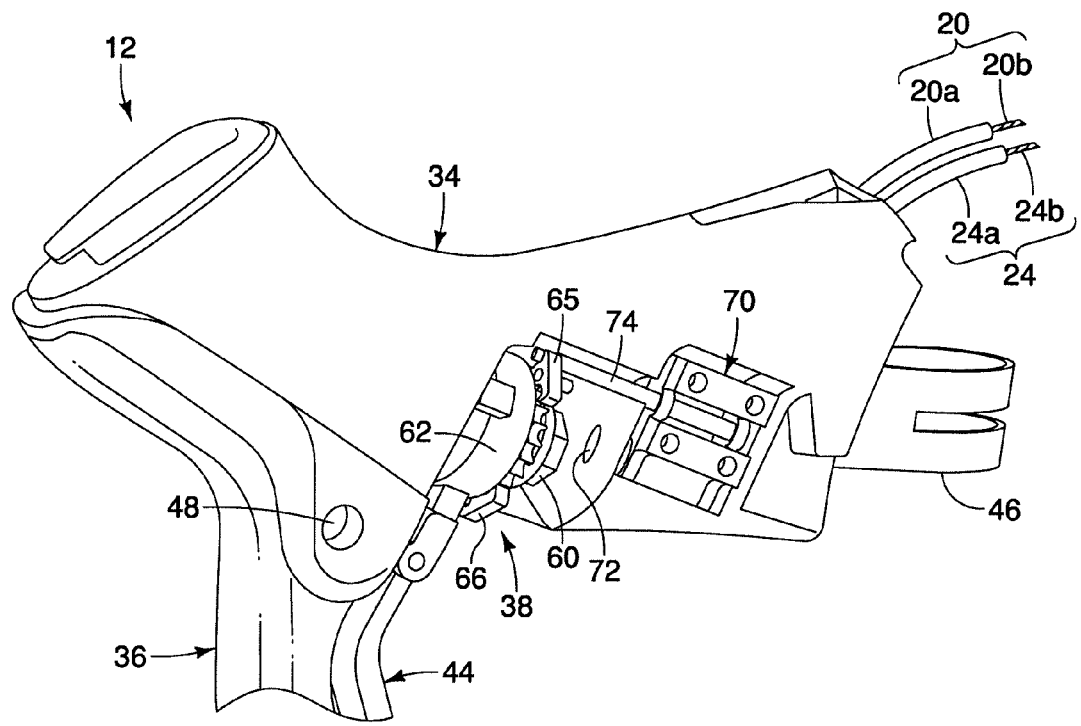
FIG. 9 is an enlarged perspective view of a portion of the right bicycle shift and brake control device illustrated in FIGS. 1 to 6.

As seen in FIGS. 10 and 11, the pawl releasing member 70 selectively locates the locking pawl 65 from the locking position to the release position. The third pivot axis A3 of the pawl releasing member 70 is offset from both of the first pivot axis A1 of the takeup member 62 and the second pivot axis A2 of the locking pawl 65. In response to pivotal movement of the pawl releasing member 70 about the third pivot axis A3 in a first rotational direction (shown by an arrow in FIGS. 10 and 11), the elongated bar 74 of the pawl releasing member 70 contacts the actuating abutment 65c of the locking pawl 65 to pivot the locking pawl 65 in the same first rotational direction from its rest (gear maintaining) position to its release position. More specifically, as seen in FIGS. 7 and 9, the elongated bar 74 extends toward the locking pawl 65 in a direction parallel to the third axis A3.

As mentioned above, the actuating portions 40b and 42b of the release operating members 40 and 42 are fastened to the pawl releasing member 70 above the reference plane RP while the user operating portions 40a and 42a are located below the reference plane RP. In this way, the pawl releasing member 70 is pivoted about the third pivot axis A3 as either one of the release operating members 40 and 42 is push in an outward direction with respect to the bicycle longitudinal center plane CP (FIG. 4) of the bicycle 10.

Referring back to FIGS. 6 and 7, the winding operating member 44 is movably mounted relative to the bracket 34 between a normal rest position and a wire winding position. The winding operating member 44 includes a user operating portion 44a, an attachment portion 44b, a hinge pin 44c and a torsion spring 44d. The operating portion 44a is pivotally attached to the attachment portion 44b by the hinge pin 44c. The attachment portion 44b is pivotally mounted on the support pin 60 for lateral pivotal movement on the first pivot axis A1. The torsion spring 44d is mounted on the hinge pin 44c with one end of the torsion spring 44d contacting the user operating portion 44a and the other end of the torsion spring 44d contacting the attachment portion 44b so that the user operating portion 44a is biased forward to a rest position. The user operating portion 44a is disposed directly behind the brake operating member 36 so that the brake operating member 36 contacts and pivots the operating portion 44a rearward as the brake operating member 36 is pulled rearward to perform a braking operation. Thus, the winding operating member 44 moves with the brake operating member 36 as the brake operating member 36 is moved along the brake operating path. The user operating portion 44a moves along a winding operating member operating path that is located on the first side S1 of the braking plane BP as the winding operating member 44 actuates the shift operating unit 38 to perform a wire winding operation in response to movement of the user operating portion 44a of the winding operating member 44 from the rest position of the winding operating member 44 to the wire winding position of the winding operating member 44. This wire winding operation cause the winding pawl 66 to move into engagement with one of the winding teeth 64b to rotate the takeup member 62 and the gear positioning plate 64 together against the urging force of the torsion spring 63 as discussed above.

Now the left control device 14 will be briefly discussed. As mentioned above, in the illustrated embodiment, the left control device 14 is essentially identical in construction and operation to the right control device 12, except that the left control device 14 is a mirror image of the right control device 12 and the number of shift positions for the control devices 12 and 14 are different. As seen in FIG. 2, the left control device 14 has a bracket 134, a brake operating member or lever 136, a first release operating member or lever 140, a second release operating member or lever 142 and a winding operating member or lever 144 that are identical in construction and operation to the corresponding parts of the right control device 12, except that they are mirror images of the corresponding parts of the right control device 12. Thus, the release operating members 140 and 142 are attached to a pawl release member 170, which is identical in construction and operation to the pawl release member 70, but for the pawl release member 170 being a mirror image of the pawl release member 70.

Figure 16:
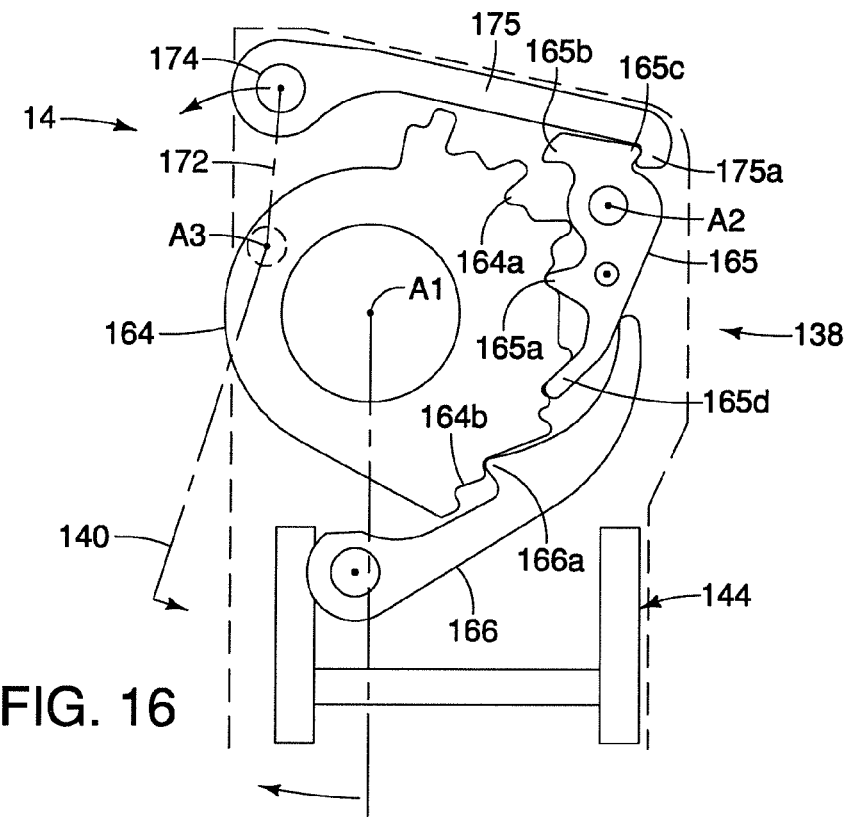
FIG. 16 is a simplified illustration of selected parts of a shift operating unit of the left bicycle shift and brake control device illustrated in FIG. 2 with the shift operating unit in a rest position.
Figure 17:
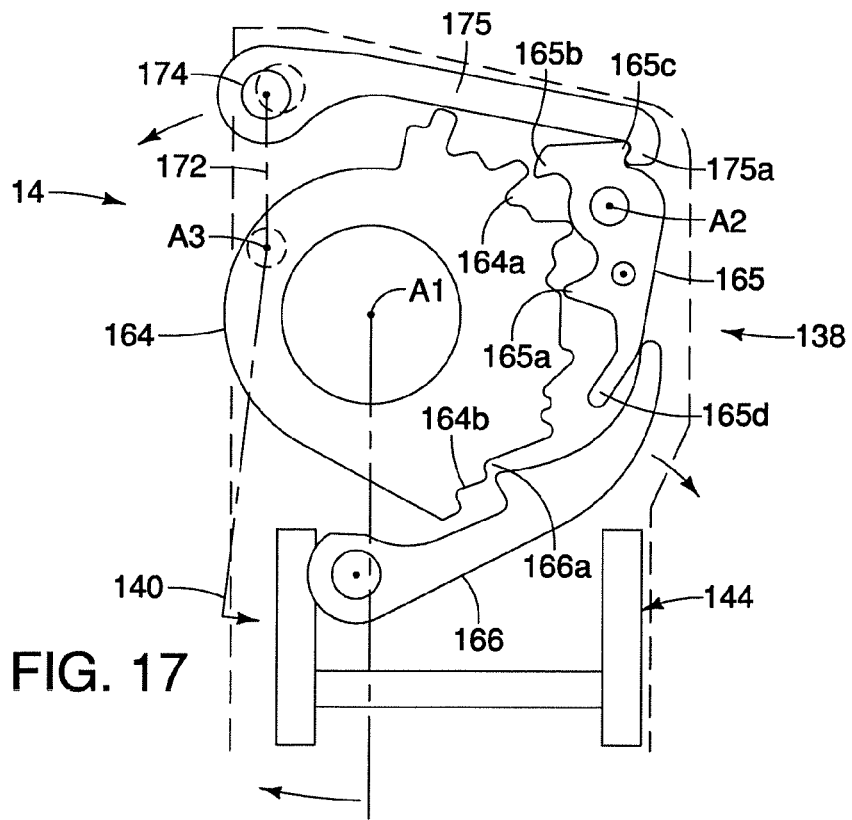
FIG. 17 is a simplified illustration of selected parts of the shift operating unit of the left bicycle shift and brake control device illustrated in FIG. 2 with the release pawl moved to a release position for performing a wire releasing operation.

Referring now to FIGS. 16 and 17, simplified illustrations of selected parts of a shift operating unit 138 of the left control device 14 will now be briefly discussed. FIGS. 16 and 17 show a basic releasing operation of the shift operating unit 138 of the left control device 14 with the pawl releasing member being moved from a rest position (FIG. 16) to a release position (FIG. 17) for performing a wire releasing operation. The shift operating unit 138 is located in a shift unit receiving recess that is formed on the inner exterior lateral side of the bracket 134. Similar to the shift operating unit 38 of the right control device 12, the shift operating unit 138 is mainly supported on the bracket 134 by a support pin or main axle that forms the first main pivot axis A1 of the shift operating unit 138. The winding operating member 144 is also pivotally supported on this same support pin similar to the winding operating member 44 of the right control device 12.

In the illustrated embodiment, the shift operating unit 138 basically includes a gear positioning plate or member 164, a locking pawl 165 and a winding pawl 166. The gear positioning plate 164 is fixed to a takeup member (not shown) as an integrated unit so as to rotate together similar to the configuration in the right control device 12. In the left control device 14, the gear positioning plate 164 has a plurality of positioning teeth 164a and a plurality of winding teeth 164b similar to the configuration in the right control device 12. However, there are less of the positioning teeth 164a and the winding teeth 164b in the left control device 14 than in the right control device 12. The gear positioning plate 164 is biased in the wire releasing direction (counterclockwise as seen in FIGS. 16 and 17) by a return spring similar to the configuration in the right control device 12. However, the locking pawl 165 normally holds the gear positioning plate 164 in place against the urging force of the return spring, since the locking pawl 165 is biased into engagement with the positioning teeth 164a as seen in FIG. 16. Thus, the locking pawl 165 can also be considered a positioning/release pawl that is configured to selectively engage the positioning teeth 164a of the gear positioning plate 164 such that the gear positioning plate 164 has a plurality of operating positions (e.g., three operating positions as shown). Accordingly, the locking pawl 165 contacts the positioning teeth 164a of the gear positioning plate 164 to attain the plurality of operating positions by preventing the gear positioning plate 164 from moving with respect to the bracket 134 in the wire releasing direction when the locking pawl 165 is engaged with one of the positioning teeth 164a.

On the other hand, the winding pawl 166 is configured and arranged to move the gear positioning plate 164 in the wire pulling direction (clockwise as seen in FIGS. 16 and 17). The winding pawl 166 is mounted on the winding operating member 144 such that the winding pawl 166 moves with the winding operating member 144 as the winding operating member 144 is pivoted on the first pivot axis A1. When the winding operating member 144 is in the rest position, the winding pawl 166 is held out of engagement from the winding teeth 164b by the locking pawl 165. However, as the winding operating member 144 is pivoted (clockwise as seen in FIGS. 16 and 17), the winding pawl 166 moves into engagement with one of the winding teeth 164b to rotate the gear positioning plate 164 against the urging force of the return spring.

The locking pawl 165 is movably arranged on the bracket 134 to selectively engage the positioning teeth 164a of the gear positioning plate 164. In this particular embodiment, the locking pawl 165 is pivotally mounted relative to the bracket 134 to pivot on the second pivot axis A2 that is formed by a pin of the bracket 134. Thus, the locking pawl 165 is movably arranged between a locking position and a release position. A torsion spring (not show) biases the locking pawl 165 to the locking position (FIG. 16).

The locking pawl 165 includes a locking tooth 165a, a restricting tooth 165b, an actuating abutment 165c and a wind pawl abutment 165d. In the locking position of the locking pawl 165, the locking pawl 165 engages one of the positioning teeth 164a of the gear positioning plate 164 to hold the gear positioning plate 164 for maintaining a desired gear position of the front derailleur 26. As the locking pawl 165 moves from the locking position to the release position, the locking pawl 165 initially releases the gear positioning plate 164 so that the gear positioning plate 164 can move under the urging force of the return spring. In the release position of the locking pawl 165, the locking pawl 165 rotates in a counterclockwise direction as seen in FIGS. 16 and 17 so that the restricting tooth 165b engages one of the positioning teeth 164a of the gear positioning plate 164 and the wind pawl abutment 165d disengages the winding pawl 166 from the winding teeth 164b. The restricting tooth 165b restricts movement of gear positioning plate 164 such that the gear positioning plate 164 cannot rotate more than one gear position in the wire releasing direction.

Now the configuration and operation of the winding pawl 166 will be briefly discussed. The winding pawl 166 is pivotally mounted on a pin of the winding operating member 144. The winding pawl 166 includes a driving tooth 166a. The winding pawl 166 is biased towards engagement with the winding teeth 164b. In particular, as the winding operating member 144 is pivoted (clockwise as seen in FIGS. 16 and 17), the driving tooth 166a of the winding pawl 166 moves the gear positioning plate 164 against the urging force of the return spring as the winding operating member 144 is pivoted (clockwise as seen in FIGS. 16 and 17).

Figure 18:
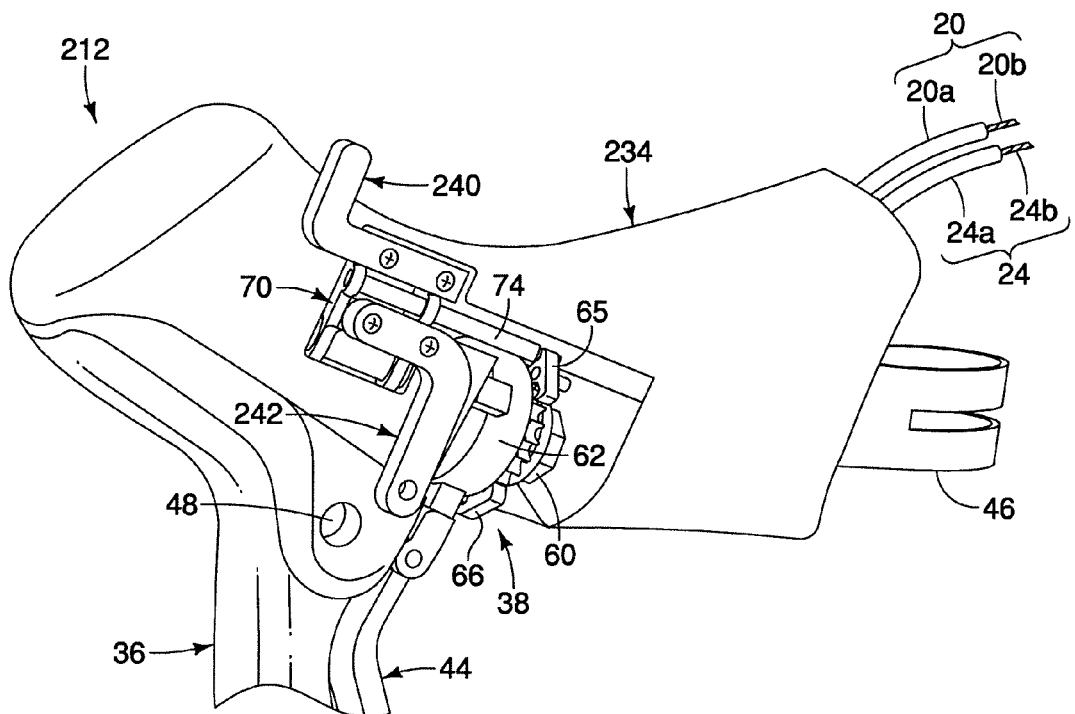
FIG. 18 is an enlarged perspective view of a portion of a right bicycle shift and brake control device in accordance with a second embodiment.
Figure 19:
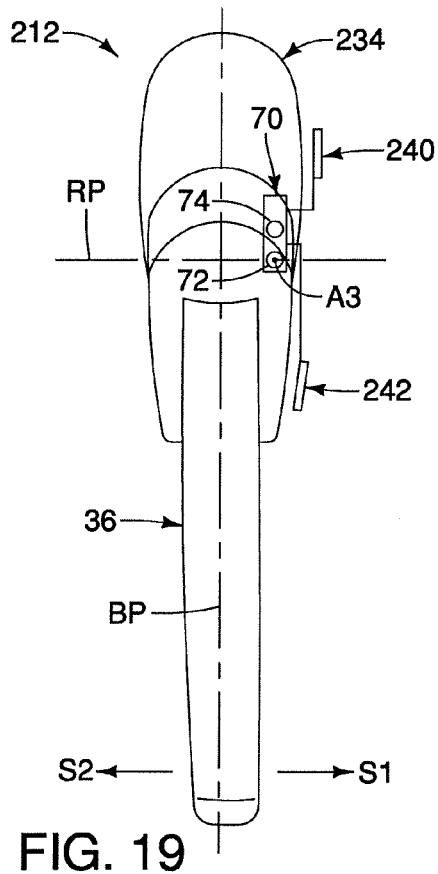
FIG. 19 is a simplified schematic front elevational view of the right bicycle shift and brake control device illustrated in FIG. 18 with the release operating members in a rest position.
Figure 20:
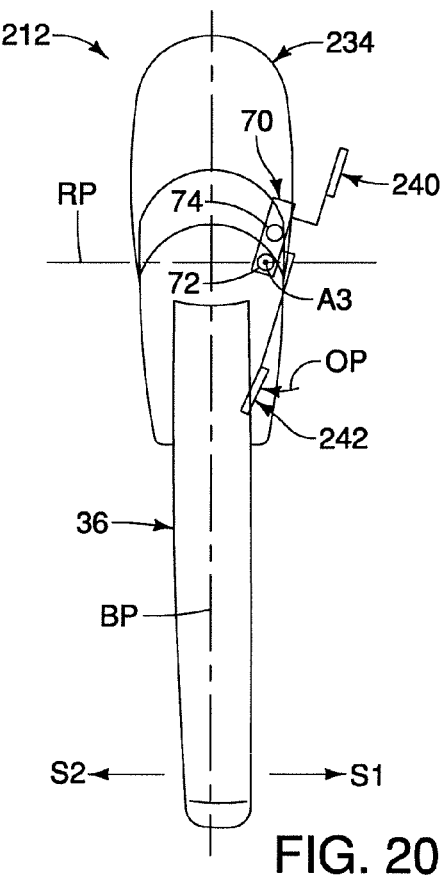
FIG. 20 is a simplified schematic front elevational view of the right bicycle shift and brake control device illustrated in FIG. 18 with the release operating members held in a wire release position.

Referring now to FIGS. 18 to 20, a right control device 212 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. Basically, the right control device 212 is identical to the right control device 12, except that the right control device 212 includes a modified bracket 234 and a pair of differently shaped release operating members 240 and 242 that are modified to accommodate a different location of the pawl releasing member 70. In this embodiment, the pawl releasing member 70 is disposed forward of the takeup member 62. Also the pawl releasing member 70 is disposed on an inner exterior lateral side of the grip portion of the bracket 234 in this embodiment. FIGS. 19 and 20 show a basic releasing operation of the shift operating unit 38 of the right control device 212 with the pawl releasing member 70 being moved from a rest position (FIG. 19) to a release position (FIG. 20) for performing a wire releasing operation.

Figure 21:
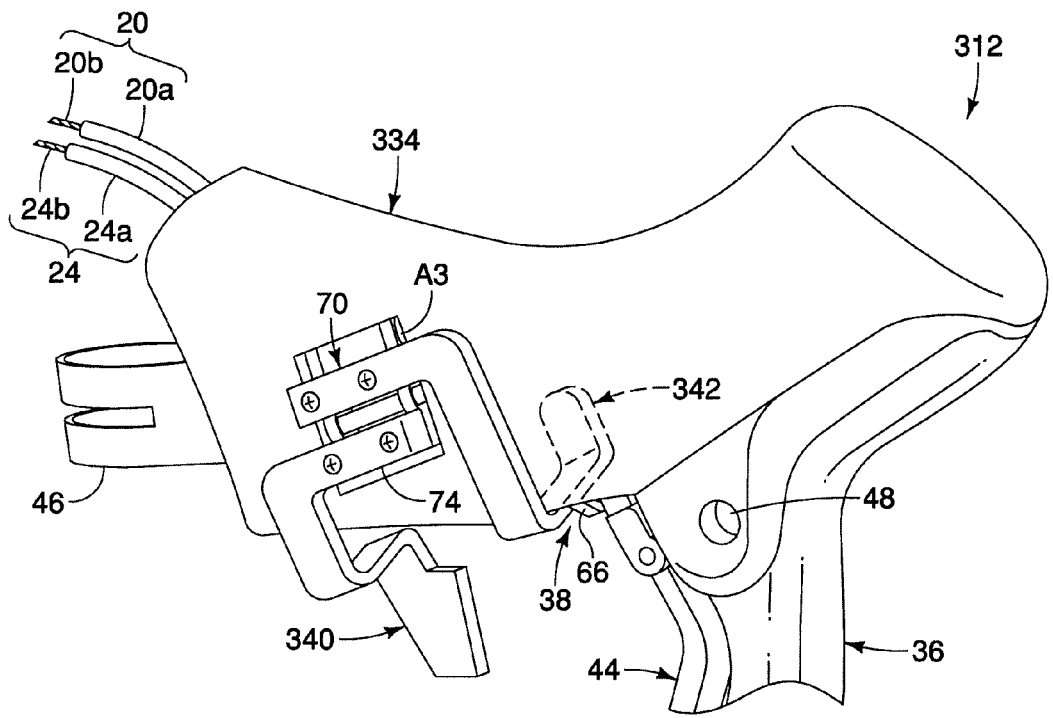
FIG. 21 is an enlarged perspective view of a portion of a right bicycle shift and brake control device in accordance with a third embodiment.
Figure 22:
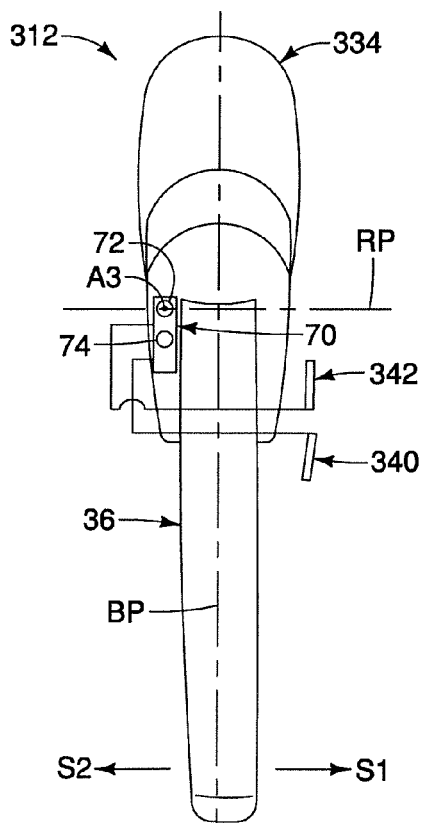
FIG. 22 is a simplified schematic front elevational view of the right bicycle shift and brake control device illustrated in FIG. 21 with the release operating members in a rest position.
Figure 23:
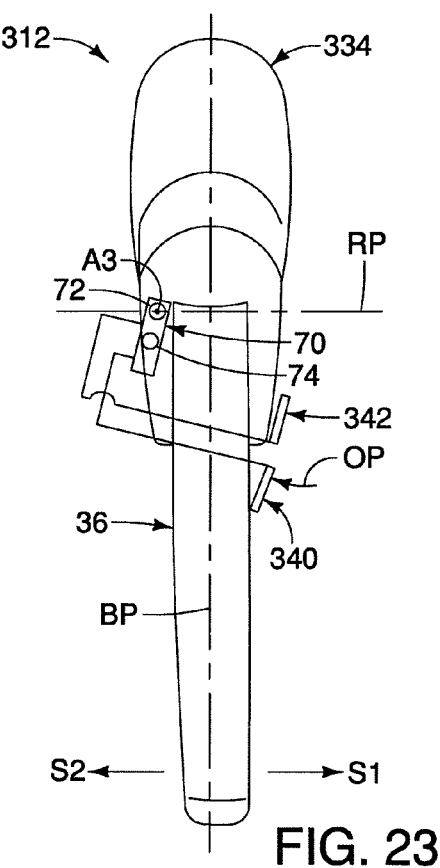
FIG. 23 is a simplified schematic front elevational view of the right bicycle shift and brake control device illustrated in FIG. 21 with the release operating members held in a wire release position.

Referring now to FIGS. 21 to 23, a right control device 312 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. Basically, the right control device 312 is identical to the right control device 12, except that the right control device 312 includes a modified bracket 334 and a pair of differently shaped release operating members 340 and 342 that are modified to accommodate a different location of the pawl releasing member 70. In this embodiment, the pawl releasing member 70 is disposed on an outer exterior lateral side of the grip portion of the bracket 334. Also the pawl releasing member 70 is disposed rearward of the takeup member 62 in this embodiment. FIGS. 22 and 23 show a basic releasing operation of the shift operating unit 38 of the right control device 312 with the pawl releasing member 70 being moved from a rest position (FIG. 22) to a release position (FIG. 23) for performing a wire releasing operation. In this embodiment, the release operating members 340 and 342 have their user operating portions located on the first side S1 of the braking plane BP and their actuating portions located on the second side S2 of the braking plane BP. In this embodiment, it is desirable that at least the user operating portions of the release operating members 340 and 342 are disposed on a first or lower side of the reference plane RP when the pawl releasing members are disposed on outward exterior lateral side of the grip portion of the bracket 334.

Figure 24:
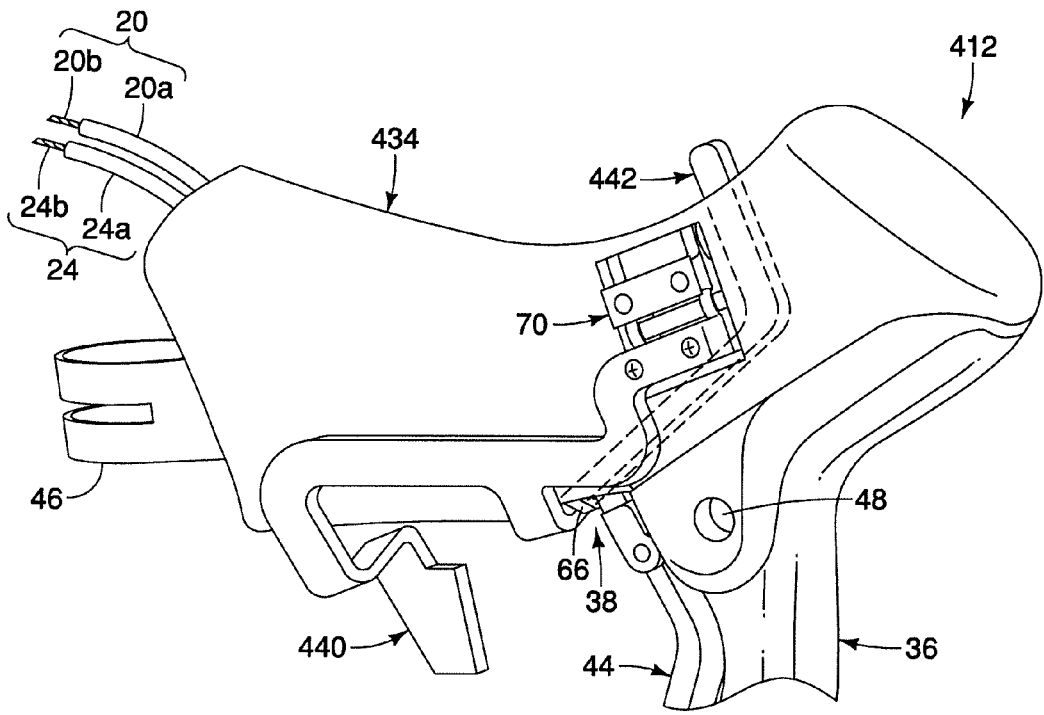
FIG. 24 is an enlarged perspective view of a portion of a right bicycle shift and brake control device in accordance with a fourth embodiment.
Figure 25:
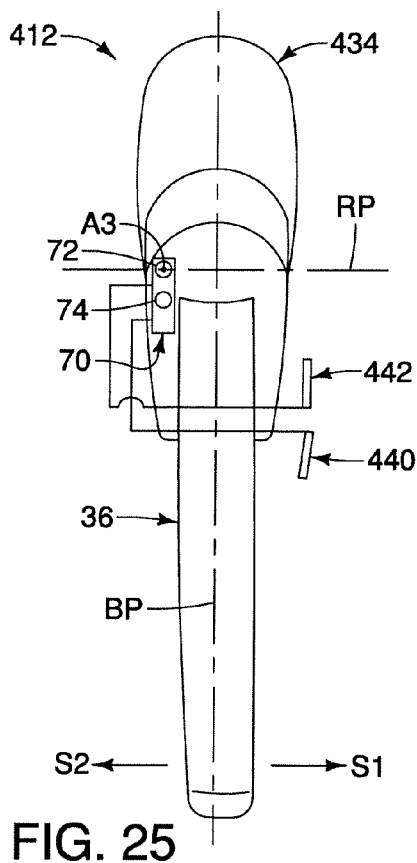
FIG. 25 is a simplified schematic front elevational view of the right bicycle shift and brake control device illustrated in FIG. 24 with the release operating members in a rest position.
Figure 26:
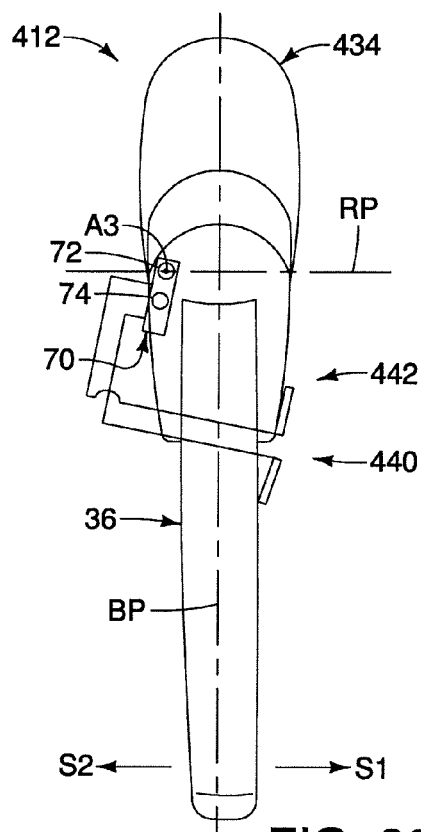
FIG. 26 is a simplified schematic front elevational view of the right bicycle shift and brake control device illustrated in FIG. 24 with the release operating members held in a wire release position.

Referring now to FIGS. 24 to 26, a right control device 412 in accordance with a fourth embodiment will now be explained. Basically, the right control device 412 is identical to the right control device 12, except that the right control device 412 includes a modified bracket 434 and a pair of differently shaped release operating members 440 and 442 that are modified to accommodate a different location of the pawl releasing member 70. In this embodiment, the pawl releasing member 70 is disposed on an outward exterior lateral side of the grip portion of the bracket 434. Also the pawl releasing member 70 is disposed forward of the takeup member 62 in this embodiment. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. FIGS. 25 and 26 show a basic releasing operation of the shift operating unit 38 of the right control device 412 with the pawl releasing member 70 being moved from a rest position (FIG. 25) to a release position (FIG. 26) for performing a wire releasing operation. In this embodiment, it is desirable that at least the user operating portions of the release operating members 440 and 442 are disposed on a first or lower side of the reference plane RP when the pawl releasing members are disposed on the outer exterior lateral side of the grip portion of the bracket 434.

Figure 27:
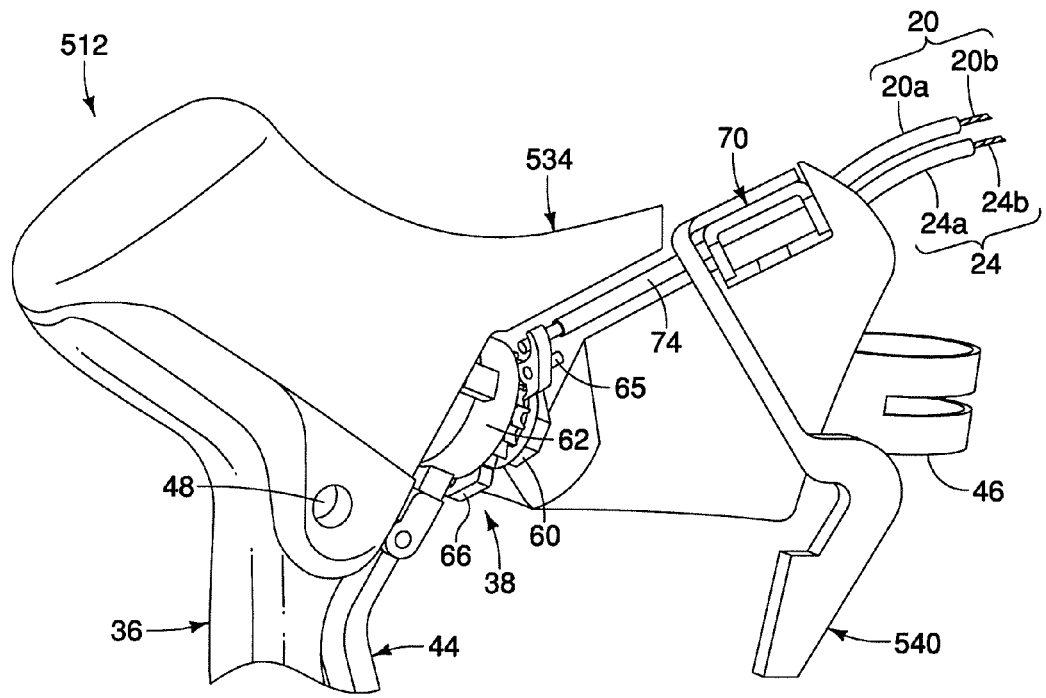
FIG. 27 is an enlarged perspective view of a portion of a right bicycle shift and brake control device in accordance with a fifth embodiment.
Figure 28:
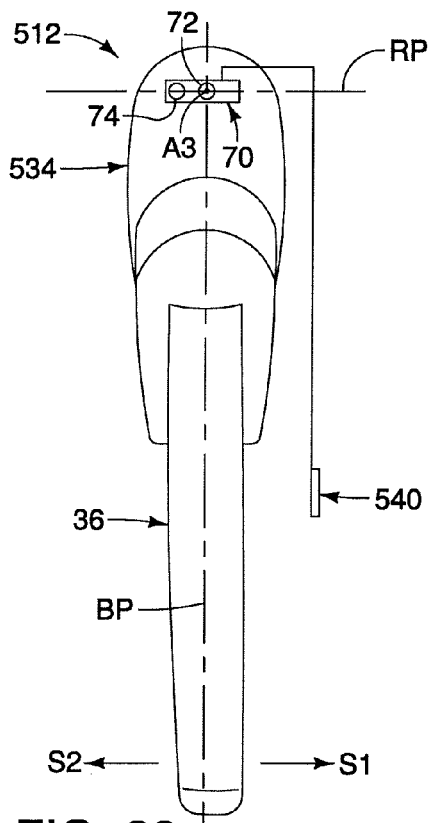
FIG. 28 is a simplified schematic front elevational view of the right bicycle shift and brake control device illustrated in FIG. 27 with the release operating member in a rest position.
Figure 29:
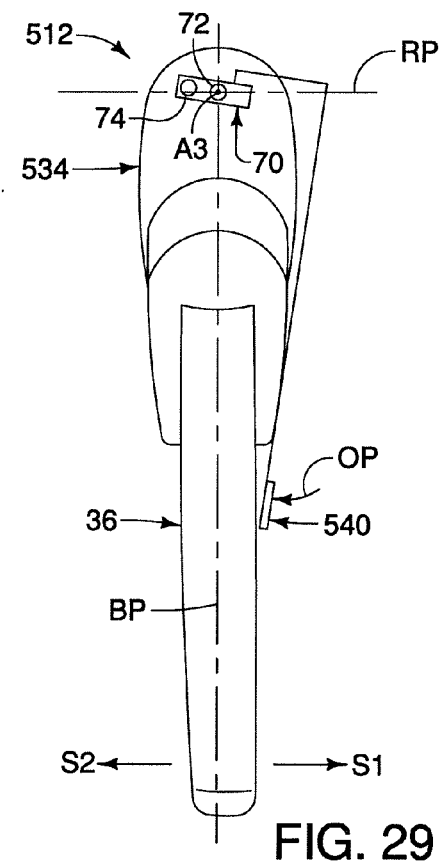
FIG. 29 is a simplified schematic front elevational view of the right bicycle shift and brake control device illustrated in FIG. 27 with the release operating member held in a wire release position.

Referring now to FIGS. 27 to 29, a right control device 512 in accordance with a fifth embodiment will now be explained. Basically, the right control device 512 is identical to the right control device 12, except that the right control device 512 includes a modified bracket 534 and a differently shaped release operating member 540 that are modified to accommodate a different location of the pawl releasing member 70. In this embodiment, the pawl releasing member 70 is disposed on a top exterior side of the grip portion of the bracket 534. Also, the pawl releasing member 70 is disposed rearward of the takeup member 62 in this embodiment. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. FIGS. 28 and 29 show a basic releasing operation of the shift operating unit 38 of the right control device 512 with the pawl releasing member 70 being moved from a rest position (FIG. 28) to a release position (FIG. 29) for performing a wire releasing operation.

Figure 30:
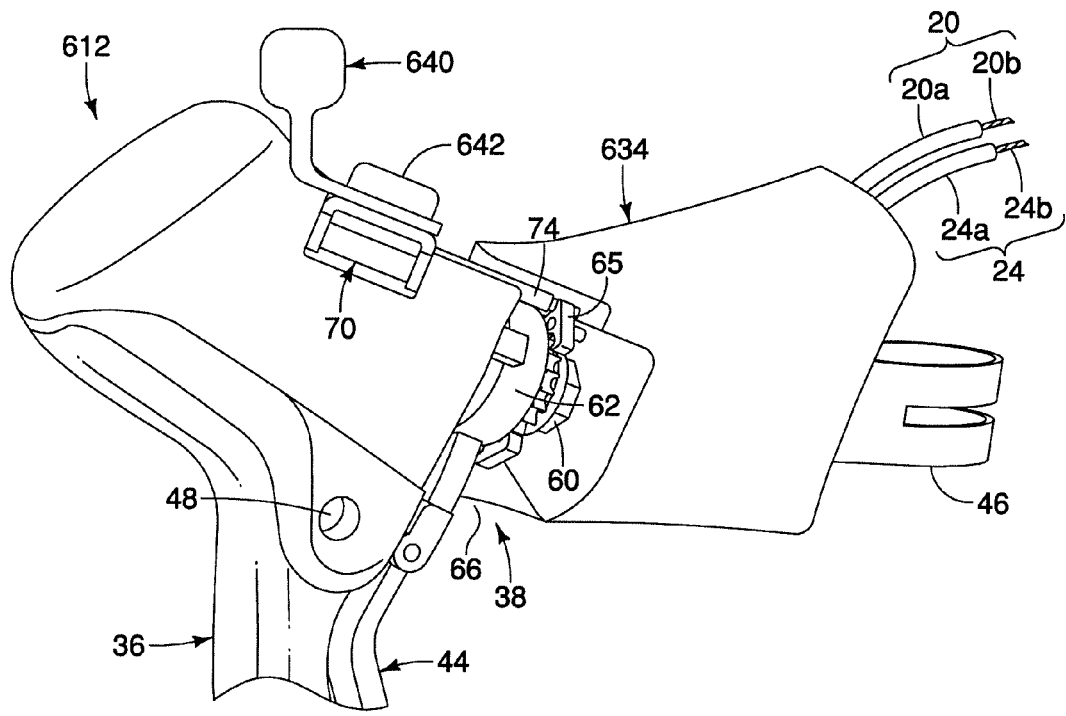
FIG. 30 is an enlarged perspective view of a portion of a right bicycle shift and brake control device in accordance with a sixth embodiment.
Figure 31:
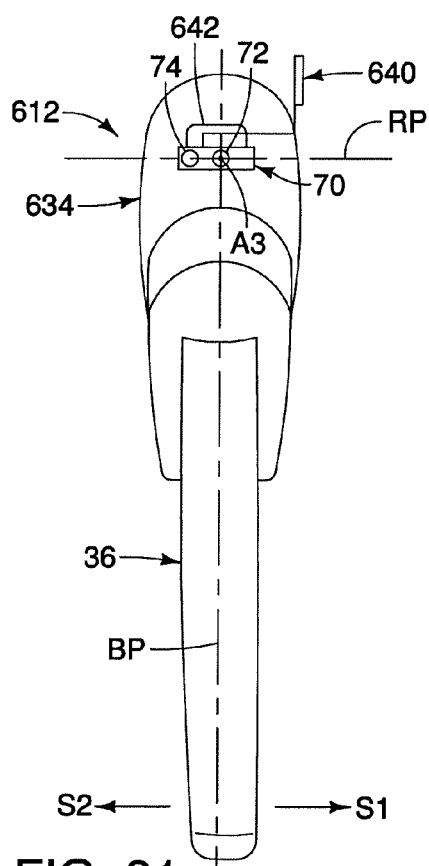
FIG. 31 is a simplified schematic front elevational view of the right bicycle shift and brake control device illustrated in FIG. 30 with the release operating member in a rest position.
Figure 32:
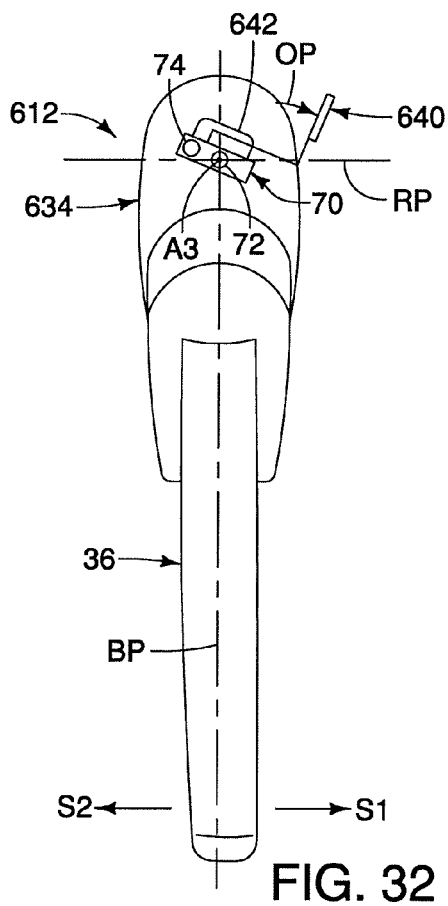
FIG. 32 is a simplified schematic front elevational view of the right bicycle shift and brake control device illustrated in FIG. 30 with the release operating member held in a wire release position.

Referring now to FIGS. 30 to 32, a right control device 612 in accordance with a sixth embodiment will now be explained. Basically, the right control device 612 is identical to the right control device 12, except that the right control device 612 includes a modified bracket 634 and two differently shaped release operating members 640 and 642 (e.g., lever and button) that are modified to accommodate a different location of the pawl releasing member 70. While the release operating members 640 and 642 are both provided on the pawl releasing member 70 as shown, it will be apparent to those skilled in the art from this disclosure that other configurations are possible. For example, only the release operating member 640 (e.g., lever) can be provided on the pawl releasing member 70, if needed and/or desired. Likewise, only the release operating member 642 (e.g., button) can be provided on the pawl releasing member 70, if needed and/or desired. In this embodiment, the pawl releasing member 70 is disposed on a top exterior side of the grip portion of the bracket 634. Also, the pawl releasing member 70 is disposed forward of the takeup member 62 in this embodiment. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity. FIGS. 31 and 32 show a basic releasing operation of the shift operating unit 38 of the right control device 612 with the pawl releasing member 70 being moved from a rest position (FIG. 31) to a release position (FIG. 32) for performing a wire releasing operation.

Figure 33:
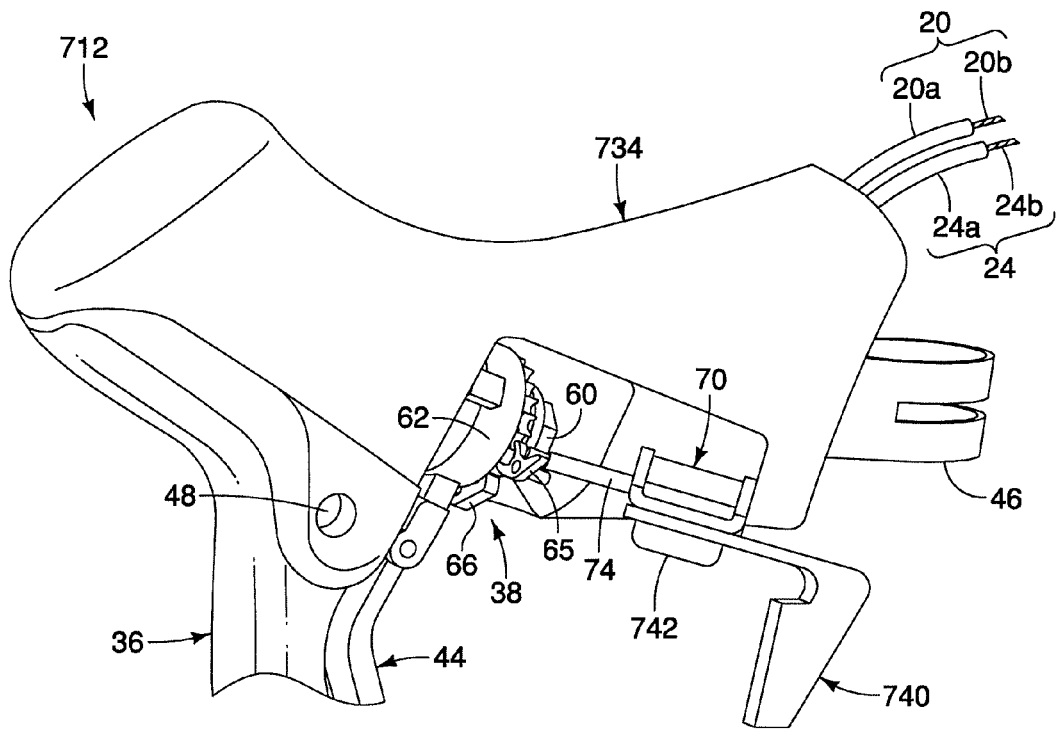
FIG. 33 is an enlarged perspective view of a portion of a right bicycle shift and brake control device in accordance with a seventh embodiment.
Figure 34:
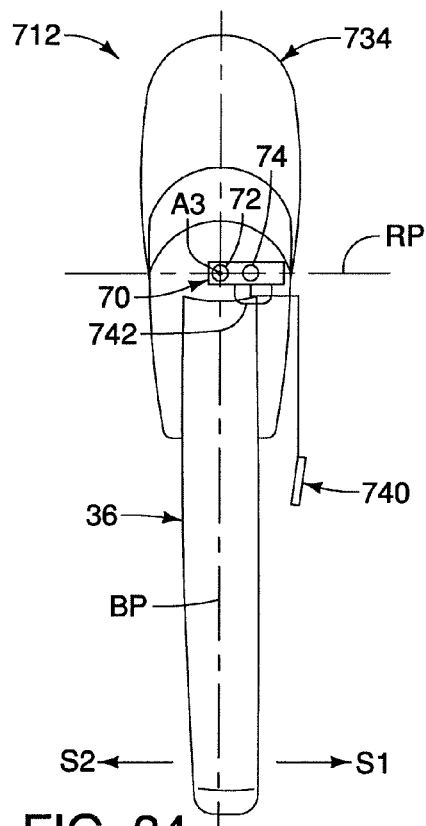
FIG. 34 is a simplified schematic front elevational view of the right bicycle shift and brake control device illustrated in FIG. 33 with the release operating member in a rest position.
Figure 35:
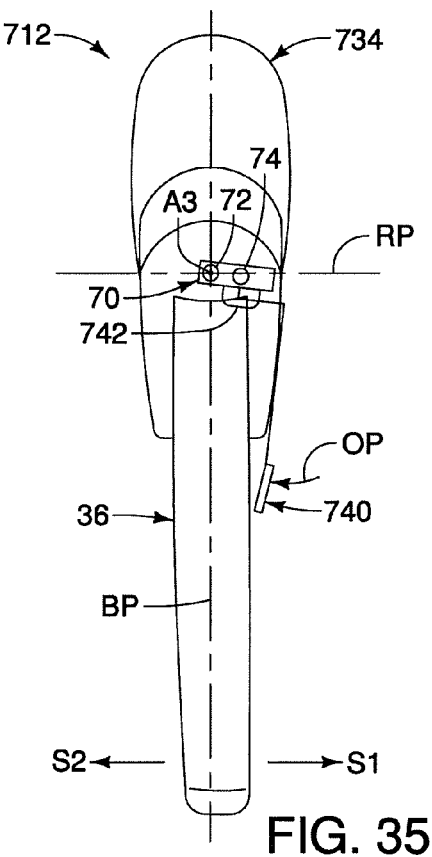
FIG. 35 is a simplified schematic front elevational view of the right bicycle shift and brake control device illustrated in FIG. 33 with the release operating member held in a wire release position.

Referring now to FIGS. 33 to 35, a right control device 712 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity. Basically, the right control device 712 is identical to the right control device 12, except that the right control device 712 includes a modified bracket 734 and two differently shaped release operating members 740 and 742 (e.g., lever and button) that are modified to accommodate a different location of the pawl releasing member 70. While the release operating members 740 and 742 are both provided on the pawl releasing member 70 as shown, it will be apparent to those skilled in the art from this disclosure that other configurations are possible. For example, only the release operating member 740 (e.g., lever) can be provided on the pawl releasing member 70, if needed and/or desired. Likewise, only the release operating member 742 (e.g., button) can be provided on the pawl releasing member 70, if needed and/or desired. In this embodiment, the pawl releasing member 70 is disposed on a bottom exterior side of the grip portion of the bracket 734. Also, the pawl releasing member 70 is disposed rearward of the takeup member 62. FIGS. 34 and 35 show a basic releasing operation of the shift operating unit 38 of the right control device 712 with the pawl releasing member 70 being moved from a rest position (FIG. 34) to a release position (FIG. 35) for performing a wire releasing operation.

Referring now to FIGS. 36 and 37, a right control device 812 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity. Basically, the right control device 812 is identical to the right control device 712, except that the right control device 812 includes a modified bracket 834 and a differently shaped release operating member 840 that are modified to accommodate a different location of the pawl releasing member 70. As seen in the schematic illustration of FIGS. 36 and 37, the release operating member 840 is pivotally coupled to the bracket 834 by the pawl releasing member 70 at the release operating member pivot axis A3 such that the user operating portion moves along the operating path OP between a rest position (FIG. 36) and a release position (FIG. 37) with the operating path OP crossing the braking plane BP such that the user operating portion is located on the first side S1 of the braking plane BP while in the rest position and such that the user operating portion is located on the second side S2 of the braking plane BP while in the release position. FIGS. 36 and 37 show a basic releasing operation of the shift operating unit 38 of the right control device 812 with the pawl releasing member 70 being moved from a rest position (FIG. 36) to a release position (FIG. 37) for performing a wire releasing operation.

In understanding the scope of the present embodiments, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiments, the following directional terms "forward", "rearward", "inward", "inner", "outward", "outer", "upward", "top", "above", "downward", "bottom", "below", "vertical", "horizontal", "right", "left", "lateral" and "transverse" as well as any other similar directional terms refer to those directions of a bicycle equipped with the bicycle brake and shift operating device (control device). Accordingly, these terms, as utilized to describe the bicycle brake and shift operating device should be interpreted relative to a bicycle equipped with the bicycle brake and shift operating device (control device) as used in the normal riding position on a flat, horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle brake and shift operating device comprising:
    a bracket including a grip portion;
    a brake operating member pivotally attached to the bracket at a pivot axis;
    a shift operating unit including a takeup member pivotally mounted relative to the bracket to pivot on a first pivot axis and a locking pawl pivotally mounted relative to the bracket to pivot on a second pivot axis, with the locking pawl being movably arranged to pivot on the second pivot axis in a first rotational direction about a first pivot pin from a locking position in which the locking pawl holds the takeup member to a release position in which the locking pawl releases the takeup member; and
    a pawl releasing member pivotally mounted relative to the bracket to pivot on a third pivot axis, with the pawl releasing member selectively locating the locking pawl from the locking position to the release position by pivoting around the third pivot axis in the first rotational direction about a second pivot pin, an entirety of the second pivot pin being spaced from the first pivot pin along a direction parallel to the third pivot axis; the third pivot axis of the pawl releasing member being offset from both of the first and second pivot axes of the takeup member and the locking pawl, and a first distance between the first and third pivot axes being smaller than a second distance between the first and second pivot axes.

2. The bicycle brake and shift operating device according to claim 1, wherein
    the pawl releasing member includes an elongated portion which contacts the locking pawl.

3. The bicycle brake and shift operating device according to claim 1, further comprising
    a release operating member operatively coupled to the pawl releasing member, with the release operating member having an operating portion.

4. The bicycle brake and shift operating device according to claim 3, wherein
the release operating member is attached to the pawl releasing member by a detachable/reattachable fastening structure that is configured for detaching and reattaching the release operating member.

5. The bicycle brake and shift operating device according to claim 1, wherein
the pawl releasing member includes a first release operating member with a first operating portion and a second release operating member with a second operating portion.

6. The bicycle brake and shift operating device according to claim 1, wherein
the pawl releasing member is disposed on an exterior lateral side of the grip portion of the bracket.

7. The bicycle brake and shift operating device according to claim 6, wherein
the exterior lateral side faces towards a bicycle longitudinal center plane when the bicycle brake and shift operating device is in an installed position.

8. The bicycle brake and shift operating device according to claim 7, wherein
the pawl releasing her is disposed rearward of the takeup member.

9. The bicycle brake and shift operating device according to claim 7, wherein
the pawl releasing member is disposed forward of the takeup member.

10. The bicycle brake and shift operating device according to claim 6, wherein
the exterior lateral side faces away from a bicycle longitudinal center plane when the bicycle brake and shift operating device is in an installed position.

11. The bicycle brake and shift operating device according to claim 10, wherein
the pawl releasing member is disposed rearward of the takeup member.

12. The bicycle brake and shift operating device according to claim 10, wherein
the pawl releasing member is disposed forward of the takeup member.

13. The bicycle brake and shift operating device according to claim 1, wherein
the pawl releasing member is disposed on an upward facing exterior side of the grip portion of the bracket.

14. The bicycle brake and shift operating device according to claim 13, wherein
the pawl releasing member is disposed rearward of the takeup member.

15. The bicycle brake and shift operating device according to claim 13, wherein
the pawl releasing member is disposed forward of the takeup member.

16. The bicycle brake and shift operating device according to claim 1, wherein
the pawl releasing member is disposed on a downward facing exterior side of the grip portion of the bracket.

17. The bicycle brake and shift operating device according to claim 16, wherein
the pawl releasing member is disposed rearward of the takeup member.

18. The bicycle brake and shift operating device according to claim 5, wherein
the first and second release operating members have first and second free ends, respectively, that are spaced from each other.

19. A bicycle brake and shift operating device comprising:
a bracket including a grip portion;
a brake operating member pivotally attached to the bracket at a pivot axis;
a shift operating unit including a takeup member pivotally mounted relative to the bracket to pivot on a first pivot axis and a locking pawl pivotally mounted relative to the bracket to pivot on a second pivot axis about a first pivot pin, with the locking pawl being movably arranged between a locking position in which the locking pawl holds the takeup member and a release position in which the locking pawl releases the takeup member; and
a pawl releasing member pivotally mounted relative to the bracket to pivot on a third pivot axis about a second pivot pin, an entirety of the second pivot pin being spaced from the first pivot pin along a direction parallel to the third pivot axis, with the pawl releasing member selectively locating the locking pawl from the locking position to the release position by pivoting around the third pivot axis, the third pivot axis of the pawl releasing member being offset from both of the first and second pivot axes of the takeup member and the locking pawl,
the pawl releasing member including an elongated portion which contacts the locking pawl, the elongated portion extending in a longitudinal direction toward the locking pawl in a direction parallel to the third pivot axis, and the elongated portion having first and second ends spaced from each other in the longitudinal direction along the direction parallel to the third pivot axis, with the first end being spaced from the locking pawl along the direction parallel to the third pivot axis, the longitudinal direction of the elongated portion being a longest dimension of the pawl releasing member.

20. The bicycle brake and shift operating device according to claim 1, wherein
the pawl releasing member includes an elongated portion having first and second ends, the first and second ends of the elongated portion being spaced from each other in a longitudinal direction.

* * * * *